United States Patent [19]

Szita et al.

[11] Patent Number: 5,256,493
[45] Date of Patent: Oct. 26, 1993

[54] SULFONIMIDE CATALYSTS FOR COATINGS

[76] Inventors: Jeno G. Szita, 45 Oakwood Ave., Norwalk, Conn. 06850; Subban Ramesh, 900 Hope St. #6B, Stamford, Conn. 06907; William Jacobs, III, 9 Old Latern Dr., Bethel, Conn. 06801; John C. Brogan, 21 Nelson St., Stamford, Conn. 06902

[21] Appl. No.: 688,022

[22] Filed: Apr. 19, 1991

Related U.S. Application Data

[63] Continuation-in-part of Ser. No. 512,041, Apr. 26, 1990, abandoned.

[51] Int. Cl.$^5$ .............................................. B05D 1/06
[52] U.S. Cl. ..................... 428/524; 427/195; 427/388.2; 427/420; 427/421; 427/428; 427/429; 427/430.1; 427/459; 427/485
[58] Field of Search ............... 427/27, 30, 195, 388.2, 427/420, 421, 428, 429, 430.1; 428/458

[56] References Cited

U.S. PATENT DOCUMENTS

| | | | |
|---|---|---|---|
| 3,927,141 | 12/1975 | Feldman et al. | 525/428 |
| 4,031,036 | 6/1977 | Koshar | 526/220 |
| 4,064,191 | 12/1977 | Parekh | 525/186 |
| 4,118,437 | 10/1978 | Parekh | 525/162 |
| 4,166,169 | 8/1979 | Patel et al. | 156/332 |
| 4,281,075 | 7/1981 | Chattha | 525/110 |
| 4,387,222 | 6/1983 | Koshar | 526/90 |
| 4,510,290 | 4/1985 | Kirchmayr et al. | 522/33 |
| 4,542,180 | 9/1985 | Carlson et al. | 525/162 |
| 4,649,168 | 3/1987 | Kress et al. | 525/67 |
| 4,873,295 | 10/1989 | Kurosawa et al. | 525/420 |

FOREIGN PATENT DOCUMENTS

9132  2/1955  Fed. Rep. of Germany.

OTHER PUBLICATIONS

Chattha and Bauer, *Latent Acid Catalysts for Hydroxyl-Melamine Coatings*.

Primary Examiner—Michael Lusignan
Assistant Examiner—Diana Dudash

[57] ABSTRACT

Sulfonimide cure catalysts are used with aminoplast crosslinking agents and resins capable of reacting with aminoplast crosslinking agents to prepare heat curable compositions capable of crosslinking to form coatings and articles. Liquid or solid curable compositions may be prepared. Solid sulfonimide catalysts used in combination with solid glycoluril type crosslinking agents are well suited for powder coating systems containing hydroxy- and carboxyfunctional resins.

46 Claims, No Drawings

SULFONIMIDE CATALYSTS FOR COATINGS

This is a continuation-in-part of copending application(s) Ser. No. 07/512,041 filed on Apr. 26, 1990, now abandoned.

FIELD OF THE INVENTION

This invention relates to the use of sulfonimide cure catalysts in combination with aminoplast crosslinkers and their use in curable compositions.

BACKGROUND OF THE INVENTION

Alkyl and aryl sulfonic acids have found utility in industry as "strong acid" catalysts capable of activating acid-sensitive curable compositions to produce cured coatings, moulded articles or adhesives.

U.S. Pat. Nos. 3,927,141 and 4,118,437 disclose powder coating compositions containing alkoxyalkyl groups carrying aminoplasts which are cured with an acid catalyst including sulfonic acids, and U.S. Pat. No. 4,064,191 discloses organic solvent-based compositions thereof.

It is well known in the art that strong acids such as sulfonic generally favor rapid cure. However, it is suggested in U.S. Pat. No. 4,031,036, that acid strength alone does not always determine effectiveness of a catalyst in complex reactions. In many cases, strong acids produce less than "smooth" surfaces having a "sandpaper-like" appearance. Furthermore, because of the extreme reactivity of sulfonic acid catalysts, curable powders containing them have been unsatisfactory because of poor package stability. The poor package stability is associated with room temperature crosslinking of the curable powders catalyzed by the excessively strong sulfonic acid catalysts. As a result, the low temperature reaction often causes clumping and sintering or fusing of the powdered resin. These are undesirable because they impair fluidization of the powder during application contributing to the production of non-uniform coatings with diminished gloss.

As a partial solution for low temperature crosslinking, U.S. Pat. Nos. 4,510,290 and 4,281,075 disclose the use of latent-reactive sulfonic acid catalysts such as benzoin tosylates and beta-hydroxy tosylates, respectively. The chemistry of the beta-hydroxy tosylate latent acid catalysts is described in *Ind. Eng. Chem. Prod. Res. Dev.*, 22, 440 (1983). Even though latent catalyst approach improves the shelf-life of the cure catalyst-containing powder coating compositions, the overall film properties and appearance of the cured films have been no better than non-latent sulfonic acid catalyzed systems because the active catalyst in both systems is the same: a sulfonic acid.

Powder coating technology is dominated by isocyanate crosslinked and epoxide crosslinked reaction systems which are of relatively high cost. Improved crosslinking systems based on aminoplast resins when used in combination with solid components offer cost attractive alternative powder coating formulations.

This invention provides sulfonimides as improved catalysts useful in the curing of aminoplast crosslinkable resin compositions with particular utility in powder coatings/formulations.

SUMMARY OF THE INVENTION

This invention is a curable composition comprising:
(i) a sulfonimide cure catalyst,
(ii) an aminoplast crosslinking agent containing at least 2 crosslinkable groups, and
(iii) a polyfunctional material capable of reacting with aminoplast crosslinking agents.

This invention is also a crosslinker/catalyst combination suitable for admixture with an aminoplast crosslinkable resin. The crosslinker/catalyst combination comprises:
(a) a sulfonimide cure catalyst, and
(b) an aminoplast crosslinking agent.

This invention is also a catalyst/polyfunctional material combination suitable for admixture with aminoplast resins, said combination comprising:
(a) a sulfonimide cure catalyst, and
(b) a polyfunctional material capable of reacting with aminoplast crosslinking agents.

This invention is also an improved method of coating substrates by applying to said substrates the curable coating compositions of the invention.

This invention is also a crosslinked article or coating formed from heat-activating the curable compositions of the invention.

DETAILED DESCRIPTION OF THE INVENTION

Curable Coating Compositions

The curable composition of this invention comprises:
(i) a sulfonimide cure catalyst of this invention,
(ii) a crosslinkingly effective amount of an aminoplast crosslinking agent containing at least 2 crosslinkable groups,
(iii) a polyfunctional material capable of reacting with aminoplast crosslinking agents,
(iv) optional ingredients.

SULFONIMIDE CURE CATALYSTS

The novel cure-catalysts of this invention are represented by the Formula:

$RSO_2NZSO_2R$ wherein each of the R groups is, independently:
(1) a linear, branched, cyclic alkyl, fluoroalkyl, N,N-dialkylamino group of 1 to 20 carbon atoms, or mixtures thereof; or
(2) an aryl group of 1 to 20 carbon atoms containing 5 or less aromatic or heterocyclic aromatic rings substituted by $R^1$, $R^2$, $R^3$, $R^4$, and $R^5$ groups, wherein $R^1$, $R^2$, $R^3$, $R^4$, and $R^5$ groups are the same or different groups selected from a group consisting of hydrogen, fluoro, alkyl, fluoroalkyl, aryl, haloaryl, carboxy, mercapto, vinyl, chloro, bromo, cyano, nitro, sulfonyl, acyl, alkoxycarbonyl, alkoxy, perfluoroalkoxy, hydroxy, amino, acylamino, alkoxycarbonylamino, carbamoyl, aminocarbonyl, N-alkyl aminocarbonyl, and N,N-dialkylaminocarbonyl groups; or
(3) an aralkyl group wherein the alkyl and the aryl groups have the same meaning as the alkyl and aryl groups (1) and (2) above; and wherein the Z group of the formula is:
(4) hydrogen,
(5) acyl, or
(6) an alkyl or an aralkyl group of 1 to 20 carbon atoms inclusive of sulfonimides as described in DeChristopher, P. J., et. al., J. Amer. Chem. Soc., Vol. 91 (9), p. 2384 (1969) and Curtis, V. A., et. al., Tetrahedron Lett., Vol. 12, p. 199 (1981).

Alkyl or aralkyl groups of (6) which are preferred as the substituent Z are those containing at least one hydrogen at the position beta to the point of attachment of the alkyl group to the nitrogen of the sulfonimide such that upon nucleophilic deacylation reaction of the acylated sulfonimide or upon heat-activated or base-catalyzed elimination or nucleophilic displacement reaction of the alkylated sulfonimide, an unsubstituted sulfonimide is obtained which sulfonimide is represented by the following formula:

$RSO_2NHSO_2R$

Particularly useful are the sulfonimide cure-catalysts containing both alkyl and aryl groups such as the ortho- meta- and para-isomers of methyl tolyl sulfonimide, or mixtures thereof, the para isomer being preferred, and represented by the formula:

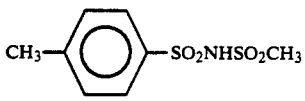

wherein the alkyl group imparts solubility and the aryl group contributes to the higher melting point. This combination of substituents produces a solid cure catalyst which is well suited to powder coatings applications.

Diarylsulfonimides are similarly well suited for powder coatings applications because of their higher melting point. Particularly useful in this invention are the para-substituted diarylsulfonimide, having Formula:

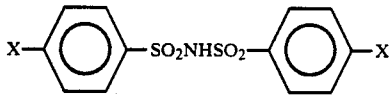

wherein X is selected from a group consisting of hydrogen, chloro, methyl, nitro, alkyl, amino, cyano, alkoxycarbonyl, carboxyl, acyl, N-alkylaminocarbonyl, and N,N-dialkylaminocarbonyl groups. In the above substituted diarylsulfonimide structure each X may also be substituted in the ortho- or meta-position.

Sulfonimides containing a plurality of imide groups are also usable as catalysts in the compositions of this invention, and can be of two types:

1. Linear polyfunctional sulfonimides, represented by the formula:

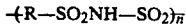

$+R-SO_2NH-SO_2)_{\overline{n}}$ wherein n groups of the $-R-SO_2NH-SO_2)$ units may be the same or different, and the R group in each of the n units is independently selected from the group consisting of:

a. a linear, branched, or cyclic or fluoroalkylene group of 1 to 20 carbon atoms; or b. an arylene group of 1 to 20 carbon atoms containing 5 or less carbocyclic or heterocyclic aromatic rings substituted by $R^1$, $R^2$, $R^3$, $R^4$, and $R^5$ groups, wherein $R^1$, $R^2$, $R^3$, $R^4$, and $R^5$ groups are the same or different groups selected from a group consisting of hydrogen, fluoro, alkyl, fluoroalkyl, aryl, haloaryl, carboxy, mercapto vinyl, chloro, bromo, cyano, nitro, sulfonyl, acyl, alkoxycarbonyl, alkoxy, perfluoroalkoxy, hydroxy, amino, acylamino, alkoxycarbonylamino, carbamoyl, aminocarbonyl, N-alkylaminocarbonyl, and N,N-dialkylaminocarbonyl groups; or c. an aralkylene group wherein the alkylene and the arylene groups have the same meaning as the alkylene and arylene groups (a) and (b) above; and wherein n is 2 or greater; and 2. Pendant polyfunctional sulfonimides, represented by the Formula:

$P-(SO_2NHSO_2R)_n$ wherein P is either a polyfunctional group or a polymer backbone of a molecular weight greater than 500, and R is an alkyl or aryl group of 1 to 20 carbon atoms, and n is 2 or greater.

The amine salts of the sulfonimides of this invention are also usable as latent-reactive cure catalysts in the compositions of this invention. They are represented by the formula:

$RSO_2\overset{-}{N}SO_2R \quad HN\overset{+}{R}RR$ wherein the R groups are, independently:

a. a linear, branched, or cyclic alkyl, or fluoroalkyl group of 1 to about 10 carbon atoms, or mixture thereof; or b. an aryl group of 1 to 20 carbon atoms containing 5 or less carbocyclic or heterocyclic aromatic rings substituted by $R^1$, $R^2$, $R^3$, $R^4$, and $R^5$ groups, wherein $R^1$, $R^2$, $R^3$, $R^4$, and $R^5$ groups are the same or different groups selected from a group consisting of hydrogen, fluoro, alkyl, fluoroalkyl, aryl, haloaryl, carboxy, mercapto, vinyl, chloro, bromo, cyano, nitro, sulfonyl, acyl, alkoxycarbonyl, alkoxy, perfluoroalkoxy, hydroxy, amino, acylamino, alkoxycarbonylamino, carbamoyl, aminocarbonyl, N-alkylaminocarbonyl, and N,N-dialkylaminocarbonyl groups, or c. an aralkyl group wherein the alkyl and the aryl groups have the same meaning as the alkyl and aryl groups in (a) and (b) above.

One, two, or all three R groups of the amine part of the sulfonimide salts can be replaced with one, two or three hydrogen atoms to give secondary ammonium, primary ammonium, or ammonium salts, respectively. Like tertiary amine salts, these are usable in the compositions of the invention as latent-reactive cure catalysts.

The R group in the amine salts above can further be independently interrupted and substituted with heteroatoms or heteroatom-containing groups to produce amine salts such as those derived from N,N-dimethylethanolamine, triethanolamine, morpholine, 2-amino-2-methyl-1-propanol, N,N-dimethyl ethanolamine, N-methyl diethanolamine, ethanolamine, diethanolamine, and the like.

The preferred amine salts of the invention are derived from relatively low molecular weight amines which are sufficiently volatile to facilitate the expulsion of the free amines from the cured coatings either before or during the curing process.

Examples of the volatile amines are triethanolamine, diisopropylamine, triisopropylamine, in addition to the heteroatom-containing amines recited above.

The sulfonimide cure catalyst of this invention may take a latent reactive form such as an N-sulfonyl-substituted saccharin which is later reacted with a nucleophile such as ammonia, primary or secondary alcohols, mercaptans, or amines. For example:

[structure: saccharin-like compound with N—SO$_2$R and SO$_2$ + NHR$_2$ → benzamide with C(=O)NR$_2$ and SO$_2$NHSO$_2$R]

where, R is an alkyl or aryl group such as shown in the reference: Imai, Y. et. a., Nippon Kagaku Kaishi, No. 1, p. 111 (1982).

The molecular weight of the sulfonimide cure catalyst used in the crosslinker/catalyst ingredient is preferably high enough to make the sulfonimide catalyst a solid at ambient temperatures, and more preferably a solid at above ambient temperatures (viz., about 40° C.) such as those which may be encountered in commercial in-plant storage or transportation environments.

The sulfonimide catalysts are generally prepared by the reaction of sulfonyl chlorides with a sulfonamide in the presence of a base. Typical preparatory methods are taught in U.S. Pat. Nos. 3,052,656 and 4,510,324, Federal Republic of Germany Patent Nos. 765,789, 1,265,157 and 1,235,300, and DDR Patent No. 9,132.

CROSSLINKING AGENTS

Crosslinking agents of this invention are aminoplast crosslinkers commonly used in coatings, mouldings, and adhesives. The term "aminoplast" is defined herein as a class of resins prepared by the reaction of an amino group-containing compound and an aldehyde.

The reaction product of amino group-containing compounds and aldehydes is often reacted further with an alcohol to produce partially or fully alkylated derivatives. These derivatives are included in the "aminoplast" definition given above.

The term "aminoplast" as used in the context of this invention also includes phenoplasts (phenolic resins), specifically, the resole-type resins which are the reaction product of phenol and an aldehyde and have the further property of containing pendant hydroxymethyl or alkoxymethyl groups. Resole resins and resolated Novolak resins are examples of phenoplasts suitable as crosslinking agents (see, Kirk-Othmer, "Encyclopedia of Chemical Technology", Vol. 17, 3'd Edition, pages 384–390 (1985) and "Encyclopedia of Polymer Science and Engineering", Vol. 11, 2'd Edition, edited by Mark, Bikales, Overberger, and Menges, (1985) pages 45–57. Commercially avaiable phenoplasts are Bakelite ® Phenolic Baking Resins sold by Union Carbide Company, Danbury, Conn., (USA).

In the preparation of aminoplasts from amino group-containing compounds and aldehydes and subsequent alkylation, dimeric and oligomeric products resulting from self-condensation reaction are often obtained. These oligomeric self-condensation products are also included in the "aminoplast" definition given above.

The aminoplast crosslinking agents of this invention are represented by the formula:

$$A\text{—}(R)_n$$

wherein the A group in A—(R)$_n$ is an n-functional polyamino anchor molecule connected to n(R) groups via the nitrogens and includes the following systems represented by the formulae:

[structure (a): glycoluril-like bicyclic with N, R$^1$, R$^2$, N groups and two C=O]

wherein R$^1$ and R$^2$ are independently, hydrogen, alkyl or aryl groups of 1 to 10 carbon atoms;

[structure (b): triazine ring with R$^3$ substituent and N groups]

wherein
R$^3$ is an aliphatic or cycloaliphatic alkyl group, of 1 to 10 carbon atoms, such as methyl, ethyl, butyl, cyclohexyl and the like; or
R$^3$ is an aromatic group, of 1 to 10 carbon atoms, such as phenyl, tolyl, naphthyl, and the like; or
R$^3$ is an aralkyl group, of 1 to 10 carbon atoms, such as benzyl, cumyl, and the like;

[structure (c): melamine-type triazine with N substituents]

[structure (d): urea, N—C(=O)—N]

[structure (e): N—C(=O)—C(=O)—N]

[structure (f): NC(=O)—R—C(=O)CN]

wherein R is an alkylene or an arylene of 1 to 10 carbon atoms;

[structure (g): cyclic amide with N, C=O, N]

[structure (h): cyclic triamide with three C=O and three N]

(i) homopolymers containing acrylamide units of the formula:

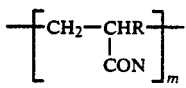

wherein R is hydrogen or alkyl and m is greater than 2, and copolymers thereof;
(j) polycarbamates;
(k) polyhydantoins;
(l) polyamides;
(m) dialkoxyethylene ureas;
(n) dihydroxyethylene urea represented by the formula:

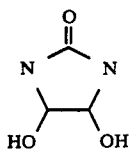

(o) homopolymers containing carbamate units of the formula:

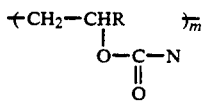

wherein R is hydrogen or alkyl, and m is greater than 2, and copolymers thereof;
(p) mixtures of any of (a) through (o); and
wherein the R group in A—(R)$_n$ is hydrogen, or an alkyl group of 1 to about 10 carbon atoms, or a crosslinkable group such as —CH$_2$OH and —CH$_2$OR$^4$ wherein R$^4$ is an alkyl group of 1 to about 10 carbon atoms or an aminoplast group-containing oligomeric group provided that the total number of the crosslinkable groups per each aminoplast crosslinking agent is at least 2, and preferably more than 2; and
wherein n in A—(R)$_n$ is the total functionality of the polyamino anchor molecule A, and is 2 or greater.

The preferred crosslinking agents of this invention are substantially fully etherified, substantially fully methylolated, substantially monomeric aminoplast crosslinkers commonly used in coatings industry. They are characterized by having at least 2, preferably more than 2 crosslinkable groups per crosslinker molecule. It is well known in the art that the minimum number of crosslinkable functional groups required to effect crosslinking is 2 provided that the aminoplast-reactive polyfunctional material has more than 2 functional groups per each molecule. If, on the other hand, the aminoplast-reactive polyfunctional material has only 2 functional groups per each molecule, then each aminoplast crosslinking agent is required to have more than two crosslinkable groups per crosslinker molecule to be capable of producing a crosslinked network.

The most preferred aminoplast crosslinking agents of the invention are selected from a group consisting of substantially fully etherified, substantially fully methylolated, substantially monomeric glycoluril, melamine, benzoguanamine, cyclohexanecarboguanamine, urea, substituted linear and cyclic ureas, and mixtures thereof.

In addition to the substantially fully etherified, substantially monomeric amine-aldehyde aminoplast crosslinking agents described above, the non-etherified or partially etherified substantially fully methylolated or partially methylolated monomeric and oligomeric aminoplasts are also usable in the compositions of this invention. The unetherified or partially etherified aminoplasts generally cure faster than the fully methylolated and etherified aminoplasts in the presence of weaker acid catalyst and may be used advantageously in such cases.

Glycoluril Crosslinkers

The most preferred glycoluril crosslinkers of this invention are N-substituted glycolurils represented by the formula:

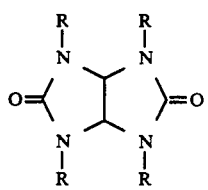

wherein at least two of the R groups are selected from a group consisting of methoxymethyl, ethoxymethyl, propoxymethyl, butoxymethyl, pentoxymethyl, hexoxymethyl, heptoxymethyl, octoxymethyl, nonoxymethyl, decoxymethyl and mixtures thereof, and the remaining R groups are selected from hydrogen, alkyl, hydroxymethyl, and glycoluril group-containing oligomeric moieties.

While it is preferable to have 4 alkoxymethyl groups per each glycoluril crosslinking agent, under ordinary circumstances it may not be necessary to obtain the pure tetrasubstituted monomeric crosslinker N,N',N'',N'''-tetraalkoxymethylglycoluril represented by formula:

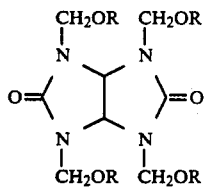

wherein R is an alkyl group of 1 to about 10 carbon atoms.

The monomeric tetraalkoxyglycolurils themselves are not considered to be resinous materials since they are, as individual entities, non-polymeric compounds. They are considered, however, to be potential resin-forming compounds when subjected to heat, and particularly when subjected to heat under acidic conditions. As a result of the described resin-forming ability, the substantially monomeric glycoluril crosslinkiers of this invention may contain some higher oligomeric components such as dimers, trimers, and tetramers. The presence of modest amounts of these oligomeric forms is permissible and indeed beneficial in cases where a high melting solid crosslinker is desirable as it is the case in powder coatings.

An example of glycoluril crosslinker of this invention is POWDERLINK® 1174 Powder Crosslinking Agent, a product of American Cyanamid Company, Wayne, N.J., and has the following properties:

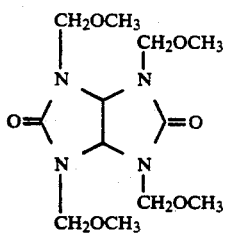

Non Volatiles, minimum (% by weight): 98
Appearance: White to pale yellow granulated flakes
Melting Point (°C.): 90°–110° C.
Average Molecular Weight: 350
Equivalent Weight: 90–125

Another example of a glycoluril crosslinker of this invention is CYMEL ® 1170 fully butylated glycoluril crosslinker, a product of American Cyanamid Company, Wayne, N.J., having the following properties:
Non Volatiles, minimum (% by weight): 95
Appearance: Clear liquid
Color, Maximum (Gardner 1963): 3
Viscosity (Gardner-Holt, 25° C.): X-$Z_2$
Molecular Weight, Average: 550
Equivalent Weight: 150–230
Methylol Content: Very low

Urea Crosslinkers

An example of a urea crosslinker usable in this invention is BEETLE ® 80 butylated urea-formaldehyde resin, a product of American Cyanamid Company, Wayne, N.J., having the following properties:
Appearance: Clear Liquid
Color, Maximum (Gardner 1963): 1
Non-Volatiles (Weight %)*: 96±2
Viscosity (Gardner-Holt, 25° C.): X-$Z_3$
Solvent Tolerance (ASTM D1198-55): >500
* Foil Method (45° C./45 min.).

Melamine Crosslinkers

The melamine-based aminoplast crosslinking agents are well known in the art and have been used extensively as effective crosslinkers in coatings.

Unlike the tetrafunctional glycolurils, alkoxymethylmelamine functionality can be a maximum of six in a crosslinkingly effective range of 2 to 6 alkoxymethyl groups per each melamine molecule.

Like the glycolurils, alkoxymethyl melamines can contain dimers, trimers, tetramers, and higher oligomers, each given combination of monomers and oligomers being preferred for a given application. For example, the lower viscosity monomer-rich compositions are preferred for solvent-based high solids coatings.

An example of the substantially fully etherified, substantially fully methylolated, substantially monomeric melamines usable in this invention is CYMEL ® 303 melamine crosslinking agent, a product of American Cyanamid Company, Wayne, N.J., and has the following properties:

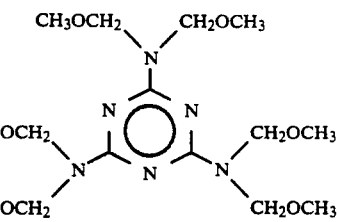

Non-Volatiles (% by weight)*: 98
Color, Maximum (Gardner 1963): 1
Viscosity (Gardner-Holt, at 25° C.): X-$Z_2$
Free Formaldehyde, maximum (weight %): 0.5
Degree of Polymerization: 1.75
* Foil Method (45° C./45 min).

Another example of the substantially fully etherified, substantially fully methylolated, substantially monomeric melamines is CYMEL ® 1168 melamine crosslinking agent, a product of American Cyanamid Company, Wayne, N.J. The alkyl group in CYMEL ® 1168 consists essentially of a mixture of methyl and isobutyl groups. It has the following properties:

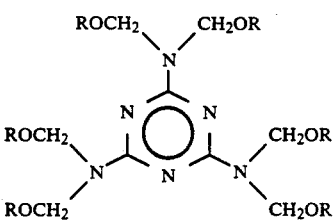

Non-Volatiles (% by weight)*: 98
Color, maximum (Gardner 1963): 1
Free Formaldehyde, maximum (weight %): 0.5
Viscosity (Gardner-Holt, at 25° C.): X-$Z_2$
Equivalent weight: 150–230
* Foil Method (45° C./45 min).

An example of a substantially methylolated, partially etherified, substantially oligomeric melamine is CYMEL ® 370 crosslinking agent, a product of American Cyanamid Company, Wayne, N.J. It has the following properties:
Non-Volatiles (% by weight)*: 88±2
Solvent: Isobutanol
Viscosity (Gardner-Holt, at 25° C.): $Z_2$-$Z_4$
Color, maximum (Gardner 1963): 1
Equivalent Weight: 225–325
* Foil Method (45° C./45 min)

Guanamine Crosslinkers

As in melamines, the partially or fully methylolated or etherified alkyl and aryl guanamine aminoplasts, both in their monomeric and oligomeric forms, are usable as crosslinking agents in this invention, with the selection depending on the particular application or the properties desired in the product.

Benzoguanamine, cyclohexylcarboguanamine and acetoguanamine aminoplasts are especially preferred as crosslinkers in this invention. The benzoguanamine crosslinkers are represented by the formula:

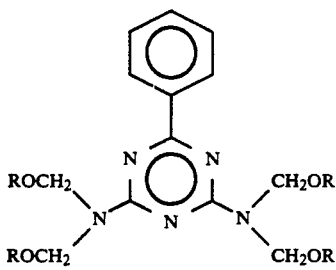

wherein R is an alkyl group of 1 to about 10 carbon atoms, or a mixture thereof. An example of a benzoguanamine-based crosslinking agent is CYMEL® 1123 Resin as described above, and wherein R is a mixture of methyl and ethyl groups.

The acetoguanamine-based crosslinkers are represented by the formula:

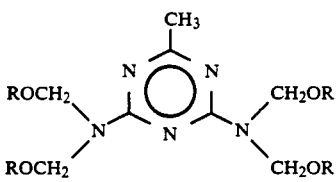

wherein each R is independently an alkyl group of 1 to about 10 carbon atoms.

The cyclohexylcarboguanamine-based crosslinkers are represented by the formula:

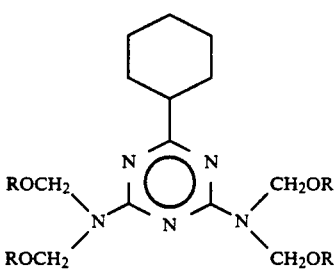

wherein each of the R groups is independently an alkyl group of 1 to about 10 carbon atoms, or a mixture thereof.

It is evident from the discussions above, that a person skilled in the art, in selecting the most suitable crosslinker for a particular application, may choose a mixture thereof which imparts a balance of properties desired for that particular application.

RATIO AND PROPORTIONS OF INGREDIENTS

The aminoplast crosslinking agent (ii) is combined with the polyfunctional aminoplast-reactive ingredient (iii) in proportions that give weight ratio of the ingredients (ii):(iii) ranging from about 1:40 to about 3:1.

The weight ratio of the sulfonimide catalyst (i) to the aminoplast crosslinking agent (ii) is from about 1:4 to about 1:400.

The effective concentration of the sulfonimide cure catalyst is from about 0.01 to about 10 weight percent based on the total weight of resin solids. It is preferably from 0.3 to 0.8 weight percent of the total resin solids.

OPTIONAL INGREDIENTS

The optional ingredients present in the curable composition of the invention vary depending on the intended use of the cured article or film.

Suitable optional ingredients include fillers, ultraviolet light stabilizers, pigments, flow control agent, plasticizers, mold release agents, and corrosion inhibitors.

The composition of the invention may contain as an optional ingredient a liquid medium. Such a medium may be used to aid the uniform application and transport of the curable composition. Any or all of the ingredients of the composition may be contacted with the liquid medium. Moreover, the liquid medium may permit formation of a dispersion, emulsion, invert emulsion, or solution of the curable composition ingredients. Particularly preferred is a liquid medium which is a solvent for the curable composition ingredients (i), (ii), and (iii). Suitable solvents are selected from alcohols, ketones, ethers, esters, water, aliphatic hydrocarbons, aromatic hydrocarbons, halogenated hydrocarbons and mixtures thereof.

POWDER COATING COMPOSITION

The novel curable powder coating composition of this invention comprises:
 (i) a sulfonimide cure catalyst of this invention,
 (ii) a polyfunctional material capable of reacting with aminoplast crosslinking agents,
 (iii) a crosslinkingly effective amount of a aminoplast crosslinking agent containing at least 2 crosslinkable groups,
 (iv) optional ingredients.

It is necessary that at least one of the powder coating ingredients (i), (ii), (iii) or (iv) be a solid, with the proviso that the solid ingredient(s) of the powder coating composition be capable of retaining the non-solid ingredient(s) to give a composition that as a whole is a solid.

A much preferred embodiment of the invention is a composition wherein the powder coating ingredients (i), (ii), (iii), and (iv) are all solids having the form of a flowable powder.

In recent years, powder coating technology has been the subject of considerable interest and commercial growth. Because powder coatings are all solids systems, they do not suffer from the solvent-related disadvantages of the solvent-based coatings systems. Powder coating minimizes the cost of shipping, storing, handling, and solvent waste disposal.

In powder coatings the ingredients used are essentially similar to conventional liquid coatings except that the powder coating composition is required to be a solid.

Preferred Powder Coating Compositions

Preferred powder coating compositions are those wherein the ingredients (i), (ii), (iii) and (iv) are all solids. More particularly, the individual composition ingredients are as described below:

(i) The novel sulfonimide cure catalysts usable in powder coatings are the sulfonimides of this invention having melting points ranging from about 40° C. to about 250° C., and more preferably ranging from about 80° C. to about 180° C.

(ii) The polyfunctional materials usable in powder coatings are the polyfunctional materials of this invention having a glass transitions (Tg) ranging from about 40° C. to about 150° C., and softening points ranging from about 40° C. to about 150° C., and more preferably ranging from about 80° C. to about 140° C.

It is preferable that the powder coating composition as a whole be a solid at ambient temperatures and that it remains solid up to about 40° C. to preserve the powdery state of the curable composition and to prevent lumping.

Upon heating, however, these resins should become fluid to permit formation of low viscosity melts which allow efficient mixing of the components of the curable composition prior to crosslinking. It is desirable that the aminoplast-reactive resins become fluid at temperatures ranging from about 80° C. to about 150° C., and most preferably from about 100° C. to about 140° C.

(iii) The aminoplast crosslinking agents usable in powder coatings are the solid aminoplast crosslinking agents of this invention having melting or softening points ranging from about 40° C. to about 150° C., and more preferably from about 80° C. to about 140° C., and most preferably from about 100° C. to about 120° C.

Glycoluril type aminoplast crosslinking agents are particularly preferred because they are solids at ambient temperatures and generally have suitable melting points.

It is preferable that the solid aminoplast crosslinking agents are solids at ambient temperatures and that they remain solids up to about 40° C. to preserve the powdery state of the curable composition and to prevent lumping. It is desirable that the aminoplast crosslinking agents become fluid at temperatures ranging from about 80° C. to about 150° C., and more preferably from 100° C. to about 140° C.

(iv) The curable powder coating compositions may include varying amounts of optional ingredients such as benzoin at about 1 to 4 weight percent level. The composition may also include as a flow control agent ingredients such as Modaflow ® Powder III Resin Modifier, a product of Monsanto Company, or Resiflow P-67 Flow Control Agent, a product or Estron Chemical, Inc. at about 1 to 2 weight percent level. Moreover, fillers and pigments such as titanium dioxide based pigments may be conventionally added to improve the appearance and properties of the coatings and articles formed from the compositions.

POLYFUNCTIONAL MATERIALS

The polyfunctional material capable of reacting with an aminoplast crosslinking agent is one of three essential components required for the curable compositions of this invention. The other essential components are aminoplast crosslinking agents such as N,N',N",N"'-tetramethoxymethylglycoluril, and sulfonimide cure catalyst such as N-(methanesulfonyl)-p-toluenesulfonamide. The aminoplast-reactive functional groups of the polyfunctional material react, under cure conditions, with crosslinkable groups to produce a three dimensional crosslinked network such as those found in coatings, moulded articles and adhesives.

The aminoplast reactive functional groups are selected from a group comprising: amino groups, amido groups, carboxyl groups, mercapto groups, hydroxy groups, and combinations of any of the aforementioned functional groups. Reactive materials having a plurality of carboxy and/or hydroxy groups are particularly preferred in the practice of the invention.

Suitable polyfunctional hydroxy reactant materials may be epoxy or polyurethane prepolymers, alkyds, acrylic resins containing pendant or terminal carboxy or hydroxy functionalities, or polyester resins with pendant or terminal hydroxy or carboxy groups. These are described in greater detail below.

In cases where resins used in the formulations of this invention are intended for powder coating applications, the resins should be solids at ambient temperatures and should remain solids up to about 40° C. to preserve the powdery state of the curable composition and prevent lumping. The aminoplast-reactive materials or resins used in the compositions of the invention preferably have a molecular weight of from about 100 to about 50,000. In the event that the aminoplast reactive material is in the form of an emulsion the molecular weight may be as high as about 5,000,000.

1. ACRYLIC RESIN AMINOPLAST-REACTIVE MATERIAL

The hydroxyfunctional acrylic resins used in formulating the curable compositions of this invention preferably have molecular weights in the range of from about 500 to about 50,000 and hydroxyl group equivalent weights of from about 200 to 4,000. An examples of a suitable acrylic resin is JONCRYL ® SCX-800 A acrylic resin, a product of S. C. Johnson and Sons, Inc., having the following physical and chemical properties:
Non-Volatiles (weight %): 98
Hydroxyl Number: 43
Equivalent Weight: 1300
Softening Point (°C.): 100
Glass Transition Temperature (Tg) (°C.): 43
Acid Value (mg KOH/g): 15
ICI Viscosity (200° C., Poise): 25

Another example of a suitable acrylic resin is JONCRYL ® SCX-800 B acrylic resin, a product of S. C. Johnson and Sons, Inc., having the following physical and chemical properties:
Non-Volatiles (weight %): >97
Hydroxyl Number: 40
Glass Transition: Temperature (Tg) (°C.): 43
Acid Value: 15-20
Softening Point (°C.): 107
Equivalent Weight: 1402
ICI Viscosity: (200° C., Poise: 45-50
or JONCRYL ® 500 acrylic resin, a product of S. C. Johnson and Sons, Inc., having the following properties:
Viscosity (centipoise): 4000
Solids Content (%): 80
Hydroxyl Number (based on solids): 140
Equivalent Weight (based on solids): 400
Molecular Weight (Mn)*: 1300
Polydispersity (Mw/Mn)**: 1.7
* Mn=Number Average Molecular Weight.
** Mw=Weight Average Molecular Weight.

Commercially available acrylic resins are generally applicable for use in preparing the compositions of the invention. Selection of the optimum acrylic resin will depend on the user's desire to impart to the final cured product particular physical properties such as hardness, flexure, chemical and solvent resistance, and etc.

2. POLYESTER RESINS

The hydroxy functional polyester resins used in formulating the curable compositions of this invention preferably have molecular weights in the range of from about 1,000 to 50,000 and hydroxyl group equivalent weights of from about 200 to 4,000.

An example of a suitable polyester resin is Arakote ® 3109 solid hydroxyl terminated polyester powder coating resin, a product of Ciba-Geigy Corporation, Hawthorne, N.Y., having the following physical and chemical properties:

| Color | Colorless Solid |
|---|---|
| OH Number | 27–32 |
| ICI Viscosity at 200° C. (Poise) | 40 |
| Glass Transition Temperature (Tg) (°C.) | 66 |
| Equivalent Weight | 1900 |

Another example of a suitable polyester resin is ALFTALAT ® AN 745 hydroxyfunctional polyester resin, a product of Hoechst Corporation, having the following physical and chemical properties:
Color, 50% (ASTM D 1544-68): 3
OH Number: 30
Equivalent Weight: 1870
Acid Value (mg KOH/g): 8
Glass Transition Temperature (Tg) (°C.): 55
ICI Viscosity (200° C., Poise): 50–65
Another example of a suitable polyester resin is ARAKOTE ® 3010 carboxyl-terminated polyester, a product of Ciba-Geigy Corporation, Ardsley, N.Y., having the following properties:
Color, Maximum (Gardner, ASTM D 2849): 2
OH Number: ≦7
Acid Value (mg KOH/g): 27–33
ICI Viscosity (200° C., Poise): 35–60
Glass Transition Temperature (Tg) (°C.): 62
Equivalent Weight: 1800
Another example of a suitable polyester resin is RUCOTE ® 101 polyester resin, a product of Ruco Polymer Corporation, Hicksville, N.Y., having the following physical and chemical properties:
Appearance: granular solid
Softening Temperature (°C.): 120
OH Number: 29
Acid Value (mg KOH/g): 1
Glass Transition Temperature (Tg) (°C.): 53
Equivalent Weight: 2000
ICI Viscosity (200° C., Poise): 53
Another example of a suitable polyester resin is CARGILL 3000 polyester, a product of Cargill Corporation, having the following physical and chemical properties:
OH Number: 50
Equivalent Weight: 1035
Glass Transition Temperature (Tg) (°C.): 56
Acid Value (mg KOH/g): 15

Upon cure, polyester resins give films of superior properties, as described in detail in the Examples. A wide variety of commercial polyester resins may be used for the aminoplast-reactive ingredient of the invention, provided such resins have the physical properties suitable for the intended application.

3. OTHER AMINOPLAST-REACTIVE SYSTEMS

Other polyhydroxy functional compounds which are useful in the practice of the invention are diols, triols, tetraols, and higher polyhydroxy alcohols. Illustrative polyhydric alcohols are pentaerythritol dipentaerythritol, tripentaerythritol, trimethylolethane, trimethylolpropane, anhydroenneahepititol, 1,2,4-butanetriol, and 1,2,6-hexanetriol. These polyols can also be used to totally or partially replace the acrylic resin or polyester resin aminoplast-reactive ingredient of the composition of the invention. However, the film properties resulting from addition of such non-resinous ingredients sometimes are inferior and lack flexibility in the cured film final product.

Polyfunctional epoxy prepolymers, alkyds, and polyurethane prepolymers are also usable as hydroxyfunctional aminoplast-reactive materials.

Polyfunctional amides are also suitable as aminoplast-reactive components, provided they have the proper physical properties suitable for the intended use. For example, for powder coatings application, they are solids at up to about 40° C. to allow the preparation of storage stable powders containing the aminoplast crosslinking agents. The crosslinked films and articles resulting from polyamide-containing curable compositions, however, have physical properties somewhat different (i.e. harder) than polyester and acrylic-based systems described above.

THE CATALYST/CROSSLINKER COMBINATION

The catalyst/crosslinker combination of the invention is a uniform mixture of the following materials:
(a) a sulfonimide cure catalyst, and
(b) an aminoplast crosslinking agent containing at least two crosslinker groups.

Suitable sulfonimide cure catalysts (a) and aminoplast crosslinking agents (b) are as set out in the preceding sections. The components (a) and (b) can each be either liquids or solids. A particularly preferred catalyst/crosslinker combination is one wherein both the sulfonimide catalyst (a) and the aminoplast crosslinker (b) are both solids at 40° C.

THE IMPROVED METHOD OF COATING BY THIS INVENTION

This invention is also an improved method of coating substrates by applying to substrates the coating composition of the invention.

A Method of Coating Using Liquid Coating Compositions

This invention is a method of coating substrates using a liquid curable coating composition, where the composition contains the following ingredients:
(i) a sulfonimide cure catalyst,
(ii) a crosslinkingly effective amount of an aminoplast crosslinking agent containing at least 2 crosslinkable groups,
(iii) a polyfunctional material capable of reacting with aminoplast crosslinking agents, and
(iv) a liquid medium.

The liquid curable coating composition of the invention may be contacted with a substrate by spraying, padding, brushing, rollercoating, curtaincoating, flowcoating, electrostatic spraying, electrocoating or dipping.

A Method of Coating Using Powder Coating Compositions

"Powder coating" is an art recognized process and is defined herein as a method of electrostatic powder spraying wherein a finely divided solid coating material is electrostatically attracted to a surface of an article. Alternatively, the powder coating composition may be contacted with the substrate by immersing the substrate in fluidized bed of powder. The article covered with the powder is heated to at least the fusion temperature of the coating composition forcing it to flow out and form a coating which is cured by further application of heat.

The prior art powder coating process can be considerably improved by using as the coating material a low temperature heat-curable aminoplast coating composition comprising as essential ingredients:

(i) a solid sulfonimide cure catalyst of this invention,
(ii) a solid polyfunctional aminoplast-reactive material, and
(iii) a solid aminoplast crosslinking agent.

The unexpectedly superior properties of the films formed from the powder coating compositions of the invention are their superior appearance manifested in gloss and smoothness, improved impact and corrosion resistance.

A typical procedure for using the compositions of the invention is as follows:

The substrates are coated with the powder coating composition of the invention and subjected to a temperature of from about 90° C. to about 350° C. to melt and spread the composition uniformly onto the substrate surface. Thereafter, the substrate is held at a temperature of from about 120° C. to about 350° C. to crosslink the composition and form the permanently cured coating.

CATALYST/POLYFUNCTIONAL MATERIAL COMBINATION

The catalyst/polyfunctional material combination of the invention is a uniform mixture of the following materials:

(a) a sulfonimide cure catalyst, and
(b) a polyfunctional material capable of reacting with aminoplast crosslinking agents.

Suitable sulfonimide cure catalysts (a) and suitable polyfunctional materials capable of reacting with aminoplast crosslinking agents (b) are set out in the preceeding sections.

The components (a) and (b) can each be either liquids or solids. A particularly preferred catalyst/polyfunctional material combination is one wherein the sulfonimide cure catalyst (a) and the polyfunctional material capable of reacting with aminoplast crosslinking agents (b) are both solids at 40° C. In the preferred mode, components (a) and (b) are blended to form a masterbatch, which is then admixed with an aminoplast crosslinking agent. Optionally, the masterbatch is admixed with an aminoplast crosslinking agent and an additional amount of polyfunctional material.

The suitable weight ratio of the catalyst (a) to polyfunctional material (b) is in the range of from about 1:10,000 to about 9:1, with ratios of from about 3:1 to about 1:20 being preferred.

The solid sulfonimide cure catalyst/polyfunctional material combinations of the invention are prepared by a process comprising the steps of:

(a) heating a mixture of a solid sulfonimide cure catalyst and a solid polyfunctional material at a temperature sufficient to produce a uniform melt-mixed resinous material,
(b) cooling said melt-mixed resinous material to a temperature sufficient to produce a solid, and
(c) crushing the solid to produce a powdered sulfonimide cure catalyst/polyfunctional material combination usable in the improved method of powder coating described hereinbelow.

IMPROVED METHOD OF POWDER COATING WITH CATALYST/POLYFUNCTIONAL MATERIAL COMBINATION

An improved method of coating substrates by contacting said substrates with a powder coating composition and thereafter heat curing said composition, wherein the improvement comprises: contacting said substrate with a curable powder coating composition comprising:

(i) a combination of sulfonimide cure catalyst/polyfunctional material capable of reacting with aminoplast crosslinking agents,
(ii) a crosslinkingly effective amount of an aminoplast crosslinking agent containing at least 2 crosslinkable groups,
(iii) optionally, an additional amount of a polyfunctional material capable of reacting with aminoplast crosslinking agents, and
(iv) other optional ingredients known to be usable in powder coatings technology.

The improved method of powder coating employs a preblended mixture of the sulfonimide cure catalyst and the polyfunctional material which mixture is further blended with the remaining ingredients and the resulting powder is applied to substrates to be coated by methods well known in the art as "Powder Coating," defined and briefly described in a preceeding section entitled "A Method of Coating Using Powder Coating Compositions."

Suitable sulfonimide cure catalysts, and polyfunctional materials capable of reacting with aminoplast crosslinking agents are set out in the preceeding sections. The ratios of the ingredients are further described below.

The sulfonimide cure catalyst/polyfunctional material combinations (i) are those previously described under the same title. In the masterbatch of catalyst/polyfunctional material combination (i), the suitable weight ratio of the sulfonimide cure catalyst to polyfunctional material is in the range of from about 1:10,000 to about 9:1, with a ratio of about 1:1 being preferred. The weight percent of the sulfonimide cure catalyst in the catalyst/polyfunctional material combination of ingredient (i) is from about 0.01 percent to about 90 percent, with 50 weight percent being preferred.

In the curable compositions of the improved method of powder coating, the weight percent of the sulfonimide cure catalyst/polyfunctional material ingredient (i) is in the range of 0.01 to 97.5 percent of the total weight of the resin-forming ingredients, with 1.0 percent being preferred. The weight ratio of the aminoplast crosslinking agent to total polyfunctional material is from about 1:40 to about 3:1, and the weight percent of the sulfonimide cure catalyst is in the range of 0.01 to about 10 weight percent of the total weight of the resin-forming ingredients.

"Resins-forming ingredients" are defined herein as the sum of the total polyfunctional material and the aminoplast crosslinking agent. Other ingredients are excluded from the above definition.

CROSSLINKED ARTICLES AND COATINGS FORMED BY THE COMPOSITIONS OF THIS INVENTION

The curable compositions of this invention containing the sulfonimide cure-catalyst of the invention can be heat cured (typically 90° C. to 400° C.) to produce crosslinked moulded articles, adhesives and coatings. Because of the polyfunctional nature of the reactants, the resulting product in this case is a crosslinked article in the form of a film such as adhesives and/or coatings or the form of an article such as molded products.

The heat-cured compositions of this invention may be employed as coatings for wire, appliances, automotive parts, furniture, pipes, machinery, and the like. Suitable surfaces include plastic, wood, and metals such as steel, and aluminum.

The heat-cured compositions may also be used to form solid articles such as cases, enclosures, and structural members.

The following Examples illustrate various embodiments of the invention.

EXAMPLE 1

Preparation of the Sulfonimide Cure Catalysts
[Prepared by the general procedure described in the following reference article: N. N. Dykhanov, Zhur. Obshchei Khim., 29, 3602 (1959); Chemical Abstracts (54) 19577g (1960).]

Part A p-Toluenesulfonyl chloride (38.2 g, 0.20 mole) was added, in five portions over a period of 90 minutes, to a heated (70° C.) solution of methanesulfonamide (19.0 g, 0.20 mole) in aqueous 5% sodium hydroxide (176 ml). Throughout the addition, a pH of 12 was maintained by frequent additions of aqueous 5% sodium hydroxide solution. After stirring for about 20 hours at about 70° C., the reaction mixture was cooled to room temperature and acidified with concentrated hydrochloric acid to pH less than 1 and extracted with dichloromethane (3×200 ml). The organic layer was separated, dried (sodium sulfate) and concentrated to 150 ml. Addition of n-heptane (200 ml) gave highly pure methyl paratolyl sulfonimide, also known as N-(methanesulfonyl)-p-toluenesulfonamide, a sulfonimide cure catalyst of the invention, as a white precipitate (18.3 g), m.p. 117°–120° C.

Example 1, Part A illustrates the preparation of a mixed aryl and alkyl group containing cure catalyst of this invention.

Part B

The procedure of EXAMPLE 1, PART A was followed with the exception that methanesulfonamide was replaced with an equivalent amount of p-toluenesulfonamide (34.2 g, 0.20 mole) and the extraction step was replaced by a purification step to give the symmetrical di-(p-toluene)sulfonimide, a sulfonimide cure catalyst of the invention, as a white solid of 96% purity, m.p. 171°–173° C.

EXAMPLE 1, PART B illustrates the preparation of the symmetrical di-(p-toluene)sulfonimide, which is another example of the sulfonimide cure catalysts of this invention.

Part C

A commercially available sulfonimide, N-(4-aminobenzenesulfonyl)benzenesulfonamide, a product of Aldrich Chemicals, Milwaukee, Wis., was used as cure catalyst in the preparation of Composition C.

Part D

The procedure of EXAMPLE 1, PART A, was followed with the exception that methanesulfonamide and p-toluenesulfonyl chloride were replaced, respectively, with equivalent amounts of p-nitrobenzenesulfonamide and a solution of p-nitrobenzenesulfonyl chloride in acetone (50 ml). Also, the extraction step was replaced with a purification step to give the symmetrical di-(4-nitrobenzene)sulfonimide, a sulfonimide cure catalyst of the invention, as an off-white solid of 98% purity, m.p. 238°–240° C.

EXAMPLE 1, PART D illustrates the preparation of another example of sulfonimide cure catalyst of this invention.

EXAMPLE 2

This example illustrates the preparation of powder coatings using the sulfonimide cure catalysts of the invention.

The following four curable compositions, Composition A, B, C, and D, were formulated using sulfonimide cure catalysts of this invention and thereafter cured at 190° C. (20 min).

1. PREPARATION OF THE CURABLE COMPOSITIONS

| | Weight (g) |
|---|---|
| A. COMPOSITION A | |
| Arakote ® 3109 Polyester (solid) | 94.00 |
| Powderlink ® 1174 Crosslinking Agent (solid) | 6.00 |
| Sulfonimide Cure Catalyst of Example 1, Part A | 0.50 |
| Benzoin (a solid additive) | 1.40 |
| R960-48 ® Titanium Dioxide Pigment (product of DuPont Company, Wilmington, Delaware) | 40.00 |
| Resiflow P-67 Flow Control Agent (product of Estron Chemical, Inc. Culvert City, Ky) | 1.30 |
| B. COMPOSITION B | |
| Arakote ® 3109 Polyester (solid) | 94.00 |
| Powderlink ® 1174 Crosslinking Agent (solid) | 6.00 |
| Sulfonimide Cure Catalyst of Example 1, Part B | 0.50 |
| Benzoin (a solid additive) | 1.40 |
| R960-48 Titanium Dioxide Pigment | 40.00 |
| Resiflow P-67 Flow Control Agent | 1.25 |
| C. COMPOSITION C | |
| Arakote ® 3109 Polyester (solid) | 94.00 |
| Powderlink ® 1174 Crosslinking Agent (solid) | 6.00 |
| Sulfonimide Cure Catalyst of Example 1, Part C | 0.50 |
| Benzoin (a solid additive) | 1.40 |
| R960-48 Titanium Dioxide Pigment | 40.00 |
| Resiflow P-67 Flow Control Agent | 1.25 |
| D. COMPOSITION D | |
| Arakote ® 3109 Polyester (solid) | 94.00 |
| Powderlink ® 1174 Crosslinking Agent (solid) | 6.00 |
| Sulfonimide Cure Catalyst of Example 1, Part D | 0.50 |
| Benzoin (a solid additive) | 1.40 |
| Titanium Dioxide Pigment | 40.00 |
| Resiflow P-67 Flow Control Agent | 1.25 |

A control composition was prepared as described above in Composition A with the exception that no cure catalyst was used.

All components were dry-blended in a Waring blender or a Welex mixer for small and larger scale runs, respectively. The dry-blended powder was then melt-mixed at about 90° C. to 135° C. for 1–5 minutes in a two roll mill to allow homogeneous mixing without allowing crosslinking to occur. The melt-mixed material was then chopped into smaller pieces in a blender mill or a pelletizer, and fed into a mill classifier where the chips were ground to a fine powder with particle size about 35 microns. The finely ground powder, charged with up to 80 KV power, was then sprayed through an electrostatic spray gun on grounded metal substrates, Bonderite ® 1000 (a product of Parker Industries, Inc.) in a spray booth.

2. CURING THE CURABLE COMPOSITIONS

The electrostatically coated Bonderite 1000 substrates containing the curable compositions of the invention were then baked in an oven at 190° C. to allow the powder to fuse, flow out and crosslink. These processes were analyzed by means of a viscometer and a rheometer.

TABLE 1 summarizes the cure conditions, the film properties resulting from curing the curable compositions and particularly the film appearance.

It is concluded from the results in EXAMPLE 2 that powder coatings prepared by using the curable compositions of this invention which contain the cure catalysts of this invention have excellent film properties and appearance. The control formulation without catalyst did not cure, showing the necessity of catalyst inclusion in the formulation.

TABLE 1
POWDER COATINGS FROM CURABLE COMPOSITIONS OF THE INVENTION
CURE CONDITIONS, FILM PROPERTIES AND APPEARANCE

| | CURABLE COMPOSITIONS* | | | |
|---|---|---|---|---|
| | Comp. A | Comp. B | Comp. C | Comp. D |
| CURE CONDITIONS | | | | |
| Catalyst of Example 1 | Part A | Part B | Part C | Part D |
| Weight of Catalyst (g) | 0.50 | 0.50 | 0.50 | 0.50 |
| Bake Temperature (°C.) | 190 | 190 | 190 | 190 |
| Bake Time (min.) | 20 | 20 | 20 | 20 |
| FILM APPEARANCE | Orange Peel Microblisters | Orange Peel Microblisters Craters | Orange Peel Microblisters | Orange Peel Microblisters Pinholes Gel Seed |
| FILM PROPERTIES | | | | |
| Film Thickness (mils) (ASTM D-1400-81) | 1.9–2.3 | 1.9–2.5 | 1.4–2.4 | 1.0–2.0 |
| Film Thickness (mm) (ASTM (D-1400-81) | 0.048–0.058 | 0.048–0.064 | 0.036–0.061 | 0.025–0.050 |
| Hardness, $KHN_{25}$ ASTM (D-1474-85) | 13.0 | 11.7 | 10.2 | 12.2 |
| MEK Rubs (Double Rubs) | 200+ | 200+ | 200+ | 200+ |
| Impact, F/R in lb) (Front/Reverse) ASTM D-2794-82 | 160/160 | 160/160 | 160/160 | 160/160 |
| Color, Tristimulus | −0.06 | −0.03 | 0.00 | 0.02 |
| Gloss, 60° | 94.1 | 94.0 | 94.1 | 78.4 |
| Gloss, 20° | 79.4 | 73.4 | 79.3 | 32.5 |
| RESISTANCE PROPERTIES | | | | |
| Humidity (60° C.) Time (hrs) ASTM D 4585-87 | 504 | 528 | 504 | 456 |
| Appearance After Testing | No Change | No Change | No Change | Dense Microblisters |
| Salt Spray, Time (hrs) ASTM B-117 | 1008 | 1008 | 1008 | 1032 |
| Creepage (mm) | 3 | 0 | 0 | 0 |
| Appearance** after testing ASTM D-610 | 9 | 9 | 9 | 9 |

*The control composition containing no catalyst did not cure well under the conditions of EXAMPLE 2. The film was removed completely in less than 2 MEK double rubs.
**Scale is 1 to 10 where 10 is the best.

EXAMPLE 3

The experiments of EXAMPLE 2 were repeated with Compositions A, B, C, and D at the slightly lower temperature of 175° C. Composition C did not cure well. The cure conditions, film properties and film appearance of the remaining compositions are summarized in TABLE 2.

It is concluded from the results in TABLE 2 that the curable compositions of this invention containing the sulfonimide cure catalysts are capable of curing at low temperatures (175° C.) to produce powder coatings with excellent film properties and acceptable appearance.

TABLE 2
Powder Coatings from Curable Compositions of the Invention

| | CURABLE COMPOSITIONS* | | |
|---|---|---|---|
| | Comp. A | Comp. B | Comp. D |
| FILM APPEARANCE | Orange Peel | Orange Peel | Orange Peel |

TABLE 2-continued

Powder Coatings from Curable Compositions of the Invention

| | CURABLE COMPOSITIONS* | | |
|---|---|---|---|
| | Comp. A | Comp. B | Comp. D |
| | Micro-blisters | Micro-blisters Craters | Micro-blisters |
| FILM PROPERTIES | | | |
| Film Thickness (mils) | 1.8–2.8 | 2.5–3.5 | 1.5–2.5 |
| Film Thickness (mm) | 0.046–0.071 | 0.064–0.089 | 0.038–0.064 |
| Hardness, $KHN_{25}$ | 11.8 | 12.7 | 10.5 |
| MEK Rubs | 20/200+ | 10/200+ | 200+ |
| Impact, F/R (in-lb) | 160/160 | 100–120/0–20 | 160/160 |
| Color, Tristimulus | −0.06 | −0.03 | 0.05 |
| Gloss, 60° | 67.4 | 68.3 | 58.9 |
| Gloss, 20° | 47.3 | 38.3 | 24.5 |
| RESISTANCE PROPERTIES | | | |
| Humidity (60° C.), Time (hrs) | 456 | 288 | 192 |
| Appearance after testing | Increased Microblister, some loss of gloss | Increased Microblisters | Increased Microblisters |
| Salt Spray, Time (hrs) | 1008 | 1008 | 1008 |
| Creepage (mm) | 2 | 0 | 0 |
| Appearance (after testing) | 9 | 9 | 9 |

EXAMPLE 4

Comparative

Curable compositions E, F, and G were prepared and cured at 190° C./20 min. by the method described in EXAMPLE 2.

| | Weight (g) |
|---|---|
| COMPOSITION E | |
| Arakote ® 3109 polyester (solid) | 94.00 |
| Powderlink ® 1174 Crosslinking Agent (solid) | 6.00 |
| Sulfonimide cure catalyst of EXAMPLE 1, PART A | 0.30 |
| Benzoin (a solid additive) | 1.40 |
| R960-48 titanium dioxide pigment | 40.00 |
| Resiflow P-67 flow control agent | 1.30 |
| COMPOSITION F | |
| Arakote ® 3109 polyester (solid) | 94.00 |
| Powderlink ® 1174 Crosslinking Agent (solid) | 6.00 |
| p-Toluenesulfonic Acid Monohydrate (solid) | 0.30 |
| Benzoin (a solid additive) | 1.40 |
| OR 650 titanium dioxide pigment | 40.00 |
| Resiflow P-67 flow control agent | 1.25 |
| COMPOSITION G | |
| Arakote ® 3109 polyester (solid) | 94.00 |
| Powderlink ® 1174 Crosslinking Agent (solid) | 6.00 |
| p-Toluenesulfonic acid monohydrate (solid) | 0.20 |
| Benzoin (a solid additive) | 1.40 |
| R960 48 titanium dioxide pigment | 40.00 |
| Modiflow III flow control agent | 1.25 |

TABLE 3 summarizes the film properties and appearance characteristics of the cured coatings obtained by curing the compositions E, F, and G.

It is concluded from the results in EXAMPLE 4 that the curable composition E of this invention containing the sulfonimide cure catalyst of EXAMPLE 1, PART A produces superior powder coatings when compared with curable compositions of the prior art such as compositions F and G containing p-toluenesulfonic acid catalyst commonly used in prior art. The prior art p-toluenesulfonic acid cured system gave unacceptable appearance, lower gloss, and failed in the salt spray test.

TABLE 3

Comparison of Sulfonimide Cure Catalyst with p-Toluenesulfonic Acid in Powder Coatings

| | CURABLE COMPOSITIONS | | | | |
|---|---|---|---|---|---|
| | Comp. E[1] | Comp. F[2] | Comp. G[3] | Comp. F[4] | Comp. G[4] |
| FILM APPEARANCE | Orange Peel Microblisters | Orange Peel Microblisters Pinholes Gel Seeds | Orange Peel Microblisters Matted | Orange Peel Microblisters Craters Gel Seed | Orange Peel Microblisters Pinholes Craters Gel Seed |
| FILM PROPERTIES | | | | | |
| Film Thickness (mils) | 2.4–2.9 | 1.7–3.0 | 1.9–2.2 | 1.9–3.3 | 2.4–3.3 |
| Film Thickness (mm) | 0.061–0.074 | 0.043–0.076 | 0.048–0.056 | 0.048–0.084 | 0.061–0.084 |
| Hardness $KHN_{25}$ | 12.1 | 12.0 | 10.8 | 10.6 | 10.1 |
| MEK Rubs | 20/200+ | 200+ | 200+ | 200+ | 200+ |
| Impact F/R (in-lb) | 160/160 | 160/160 | 45–50/45–50 | 60–80/80–100 | 140–160/40–60 |
| Color, Tristimulus | −0.06 | 0.01 | −0.05 | −0.03 | −0.02 |
| Gloss, 60° | 92.7 | 83.7 | 70.3 | 88.3 | 86.5 |
| Gloss, 20° | 78.6 | 42.9 | 25.0 | 48.1 | 48.5 |
| RESISTANCE PROPERTIES | | | | | |
| Humidity (60° C.), Time (hrs) | 456 | 504 | 120 | | |
| Appearance (after testing) | Increased Microblisters, slight loss of gloss | No change | Increased Microblisters | | |

TABLE 3-continued

Comparison of Sulfonimide Cure Catalyst with p-Toluenesulfonic Acid in Powder Coatings

| | CURABLE COMPOSITIONS | | | | |
|---|---|---|---|---|---|
| | Comp. E[1] | Comp. F[2] | Comp. G[3] | Comp. F[4] | Comp. G[4] |
| Salt Spray, Time (hrs) | 1008 | 768 | 192 | | |
| Creepage (mm) | 1 | 3 | 0 | | |
| Appearance (after testing) | 9 | | | | |

[1] 0.3% N-(Methanesulfonyl)-1-toluenesulfonamide cure catalyst, based on weight of resin solids.
[2] 0.3% p-Toluenesulfonic acid monohydrate cure catalyst, based on weight of resin solids.
[3] 0.2% p-Toluenesulfonic acid monohydrate cure catalyst, based on weight of resin solids.
[4] Repeat experiments.

EXAMPLE 5

Curable composition H was prepared by the method described in EXAMPLE 2. It was cured at 175° and 190° C. by the method described in EXAMPLE 2.

| COMPOSITION H | Weight (g) |
|---|---|
| Alftalat ® AN 745 polyester (solid) | 94.00 |
| Powderlink ® 1174 Crosslinking Agent (solid) | 6.00 |
| Sulfonimide cure catalyst of EXAMPLE 1, PART A | 0.50 |
| Benzoin (a solid additive) | 2.40 |
| R960-48 titanium dioxide pigment | 40.00 |
| Resiflow III flow control agent | 1.30 |

TABLE 4 summarizes the film properties and appearance characteristics of the cured coatings obtained by curing composition H.

This example illustrates that a sulfonimide cure catalyst of the invention produces excellent powder coating with Alftalat ® AN 745 as well as Arakote ® 3109 polyesters at two different temperatures.

TABLE 4

Powder Coatings with Alftalat ® AN 745 and Powderlink ® 1174 Cured with a Sulfonimide Cure Catalyst

| | CURABLE COMPOSITION H | |
|---|---|---|
| | 175° C. Cure | 190° C. Cure |
| FILM APPEARANCE | Orange Peel Microblisters | Orange Peel Microblisters |
| FILM PROPERTIES | | |
| Film Thickness (mils) | 2.3–2.8 | 2.1–2.5 |
| Film Thickness (mm) | 0.058–0.071 | 0.053–0.064 |
| Hardness, KHN$_{25}$ | 10.9 | 10.5 |
| MEK Rubs | 200+ | 200+ |
| Impact F/R (in-lb) | 160/160 | 160/160 |
| Color, Tristimulus | −0.07 | −0.06 |
| Gloss, 60° | 92.7 | 91.4 |
| Gloss, 20° | 77.1 | 73.4 |
| RESISTANCE PROPERTIES | | |
| Humidity (60° C.), Time (hrs) | 432 | 504 |
| Appearance (after testing) | Increased Microblisters | No Change |
| Salt Spray, Time (hrs) | 1070 | 1070 |
| Creepage (mm) | 1 | 1 |
| Appearance (after testing) | No Change | No Change |

EXAMPLE 6

Curable compositions I was prepared by the method described in EXAMPLE 2. It was cured at 175° and 190° C. by the method described in EXAMPLE 2.

| COMPOSITION I | Weight (g) |
|---|---|
| Rucote ® 101 polyester (solid) | 94.00 |
| Powderlink ® 1174 Crosslinking Agent (solid) | 6.00 |
| Sulfonimide cure catalyst of EXAMPLE 1, PART A | 0.50 |
| Benzoin (a solid additive) | 2.40 |
| R960-48 titanium dioxide pigment | 40.00 |
| Resiflow III flow control agent | 1.30 |

TABLE 5 summarizes the film properties and appearance characteristics of the cured coatings obtained by curing composition H.

This example illustrates that a sulfonimide cure catalyst of Example 1, Part A produces excellent powder coatings with Rucote ® 101 as well as Alftalat ® AN 745 and Arakote ® 3109 polyesters at two different temperatures.

TABLE 5

Powder Coatings with Rucote ® 101 and Powderlink ® 1174 Cured with a Sulfonimide Cure Catalyst

| | CURABLE COMPOSITION I | |
|---|---|---|
| | 175° C. Cure | 190° C. Cure |
| FILM APPEARANCE | Orange Peel Microblisters | Orange Peel Microblisters |
| FILM PROPERTIES | | |
| Film Thickness (mils) | 2.0–2.6 | 1.7–2.4 |
| Film Thickness (mm) | 0.051–0.066 | 0.043–0.061 |
| Hardness, KHN$_{25}$ | 11.9 | 10.8 |
| MEK Rubs | 200+ | 200+ |
| Impact F/R (in-lb) | 160/160 | 160/160 |
| Color, Tristimulus | −0.06 | −0.07 |
| Gloss, 60° | 83.5 | 91.7 |
| Gloss, 20° | 66.7 | 74.6 |
| RESISTANCE PROPERTIES | | |
| Humidity (60° C.), Time (hrs) | 336 | 504 |
| Appearance (after testing) | Some loss of gloss | No Change |
| Salt Spray, Time (hrs) | 1070 | 1070 |
| Creepage (mm) | 1 | 3 |
| Appearance (after testing) | Some blisters | Some blisters |

EXAMPLE 7

An additional sulfonimide cure catalyst was prepared by the method of EXAMPLE 1, PART A, using the same reaction conditions but different reactants:
  di-(4-Chlorobenzene)sulfonimide, prepared from
    4-chlorobenzenesulfonamide and
    4-chlorobenzenesulfonyl chloride.

Two additional curable compositions were prepared as follows:

| | Weight (g) |
|---|---|
| COMPOSITION J | |
| Arakote ® 3109 polyester (solid) | 94.00 |
| Powderlink ® 1174 Crosslinking Agent (solid) | 6.00 |

-continued

| | Weight (g) |
|---|---|
| di-(Benzene)sulfonimide cure catalyst | 0.30 |
| Benzoin (a solid additive) | 1.40 |
| R960-48 titanium dioxide pigment | 40.00 |
| Resiflow P67 flow control agent | 1.30 |
| COMPOSITION K | |
| Arakote ® 3109 polyester (solid) | 94.00 |
| Powderlink ® 1174 Crosslinking Agent (solid) | 6.00 |
| di-(4-Chlorobenzene)sulfonimide cure catalyst | 0.30 |
| Benzoin (a solid additive) | 1.40 |
| R960-48 titanium dioxide pigment | 40.00 |
| Resiflow P-67 flow control agent | 1.25 |

Compositions J and K, along with Composition E from EXAMPLE 4 were cured at 190° C./20 min by the method of EXAMPLE 2. The results are summarized in TABLE 6.

This example illustrates that both symmetrical and unsymmetrical sulfonimide cure catalyst of the invention are effective catalysts. It further illustrates that N-(methanesulfonyl)-p-toluenesulfonamide sulfonimide cure catalyst produces excellent film properties and acceptable appearance.

TABLE 6

Effect of Symmetrical and Unsymmetrical Cure Catalyst on Film Properties and Appearance

| | CURABLE COMPOSITIONs | | |
|---|---|---|---|
| | Comp. E | Comp. J | Comp. K |
| FILM APPEARANCE | Orange Peel Microblisters | Orange Peel Microblisters Some Wrinkles | Orange Peel Microblisters Wrinkles |
| FILM PROPERTIES | | | |
| Film Thickness (mils) | 2.4-2.9 | 2.0-3.0 | 1.8-2.2 |
| Film Thickness (mm) | 0.061-0.074 | 0.051-0.076 | 0.046-0.056 |
| Hardness, $KHN_{25}$ | 12.1 | 12.4 | 11.8 |
| MEK Rubs | 20/200+ | 200+ | 200+ |
| Impact F/R (in-lb) | 160/160 | 160/160 | 110-120/40-50 |
| Color, Tristimulus | -0.06 | -0.04 | 0.05 |
| Gloss, 60° | 92.7 | 93.9 | 95.1 |
| Gloss, 20° | 78.6 | 75.0 | 81.8 |
| RESISTANCE PROPERTIES | | | |
| Humidity (60° C.), Time (hrs) | 456 | 600 | 600 |
| Appearance after testing | Loss of gloss | No Change | No Change |
| Salt Spray, Time (hrs) | 1008 | 1008 | 1008 |
| Creepage (mm) | 1 | 0 | 0 |
| Appearance after testing | 9 | 9 | 9 |

EXAMPLE 8

This example illustrates that a large variety of non-sulfonimide compounds are unsuitable as catalysts in the composition of this invention, when compared to Composition E of Example 4 under the same conditions. The results are summarized in Table 7.

It is concluded from the results in Table 7 that Composition E containing the sulfonimide of Example 1, Part A, has better overall properties when compared with related catalyst systems.

TABLE 7

COMPARISON OF FILM PROPERTIES OF SUFONIMIDES WITH OTHER CATALYSTS IN POWDER COATINGS

| | MEK RUBS | IMPACT, F/R | GLOSS 60°/20° | APPEARANCE BEFORE TESTING |
|---|---|---|---|---|
| Composition E Containing the Sulfonimide of EXAMPLE 1, PART A | 20/200+ | 160/160 | 92.7/78.6 | Orange Peel Microblisters |
| 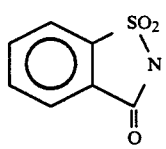 | 1/3 | — | — | — |
| 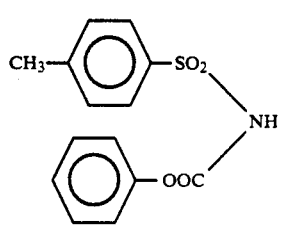 | 1/5 | — | — | — |

TABLE 7-continued
COMPARISON OF FILM PROPERTIES OF SUFONIMIDES WITH OTHER CATALYSTS IN POWDER COATINGS

| Structure | MEK RUBS | IMPACT, F/R | GLOSS 60°/20° | APPEARANCE BEFORE TESTING |
|---|---|---|---|---|
| (dibenzothiazine SO2-NH structure) | <1 | — | — | — |
| $NH_2SO_3H$ | 1/12 | — | — | — |
| PhNH+ −OTos | 200+ | 160/120-140 | 71.8/23 | Wrinkles Craters |
| naphthalene-$SO_3H$ | 200+ | 60-80/0-20 (Fail) | 79.4/32.8 | Orange Peel Microblisters Pinholes |
| (camphorsulfonic acid, $SO_3H$) | 50/200 | 50-60/0-5 | 29.4/6.4 | Texture |

EXAMPLE 9

This example illustrates that powder coating compositions of the invention containing sulfonimide cure catalyst of the invention cure faster and produce films with superior overall film properties and appearance characteristics than similar compositions containing benzoin tosylate as the cure catalyst.

The following curable compositions, Curable Composition L and Curable Composition M, were formulated and thereafter cured at 175° C. (20 min) and at 190° C. (20 min.) the procedure of EXAMPLE 2.

| | Weight (g) |
|---|---|
| COMPOSITION L | |
| Arakote ® 3109 polyester (solid) | 94.00 |
| Powderlink ® 1174 Crosslinking Agent (solid) | 6.00 |
| Sulfonimide Cure Catalyst of EXAMPLE 1, PART A | 0.5 |
| Benzoin (a solid additive) | 2.4 |
| R960-48 titanium dioxide pigment | 40.00 |
| Resiflow P-67 flow control agent | 1.3 |
| COMPOSITION M | |
| Arakote ® 3109 polyester (solid) | 94.00 |
| Powderlink ® 1174 Crosslinking Agent (solid) | 6.0 |
| Benzoin tosylate (solid) | 2.0 |
| Benzoin (a solid additive) | 1.4 |
| R960-48 titanium dioxide pigment | 40.00 |
| Resiflow P-67 flow control agent | 1.25 |

Table 8 summarizes the film properties and appearance characteristics of the cured films obtained by curing the comparative pair (Compositions L and M) at 175° C. Table 9 depicts the same at 190° C.

It is concluded from the results in Tables 8 and 9 that films obtained by curing the compositions of the invention have superior film properties and appearance characteristics than similar films cured with benzoin tosylate. It can also be concluded that higher levels of benzene tosylate catalyst are needed to achieve cure compared to sulfonimide catalysts.

TABLE 8
Comparison of a Sulfonimide Cure Catalyst of the Invention with Benzoin Tosylate in Powder Coatings Cured at 175° C.

| | Sulfonimide* Curable Comp. L | Benzoin Tosylate Curable Comp. M |
|---|---|---|
| FILM APPEARANCE | Orange Peel Microblisters | Orange Peel Microblisters |
| FILM PROPERTIES | | |
| Film Thickness (mils) | 1.5-2.2 | 2.0-2.2 |
| Film Thickness (mm) | 0.038-0.056 | 0.051-0.059 |
| Hardness, $KHN_{25}$ | 11.3 | 11.9 |
| MEK Rubs | 20/200+ | 1/15 |
| Impact F/R (in-lb) | 16/160 | 20-30/0-5 |
| Color, Tristimulus | −0.06 | −0.06 |
| Gloss, 60° | 81.1 | 92.4 |
| Gloss, 80° | 56.5 | 79.5 |
| RESISTANCE PROPERTIES | | |
| Humidity (60° C.), Time (hrs) | 504 | 96 |
| Appearance after testing | No change | Loss of Gloss |
| Salt Spray, Time (hrs) | 888 | 528 |
| Creepage (mm) | 3 | 0 |
| Appearance after testing | Blisters | Blisters |

*N-Methanesulfonyl-p-Toluenesulfonamide, sulfonimide catalyst of EXAMPLE 1, PART A

TABLE 9

Comparison of a Sulfonimide Cure Catalyst of the Invention with Benzoin Tosylate in Powder Coatings Cured at 190° C.

|  | Sulfonimide* Curable Composition L | Benzoin Tosylate Curable Composition M |
|---|---|---|
| FILM APPEARANCE | Orange Peel Microblisters | Orange Peel Microblisters |
| FILM PROPERTIES |  |  |
| Film Thickness (mils) | 1.5–2.2 | 1.6–2.0 |
| Film Thickness (mm) | 0.038–0.056 | 0.041–0.056 |
| Hardness, $KHN_{25}$ | 11.2 | 11.6 |
| MEK Rubs | 200+ | 200+ |
| Impact F/R (in-lb) | 160/160 | 150-160/150–160 |
| Color, Tristimulus | −0.05 | −0.06 |
| Gloss, 60° | 93.5 | 94.4 |
| Gloss, 80° | 74.9 | 83.4 |
| RESISTANCE PROPERTIES |  |  |
| Humidity (60°C.), Time (hrs) | 504 | 264 |
| Appearance after testing | No change | Increased Microblisters |
| Salt Spray, Time (hrs) | 960 | 528 |
| Creepage (mm) | 4 | 0 |
| Appearance after testing | Blisters | Blisters |

\* N-methanesulfonyl-p-Toluenesulfonamide, sulfonimide catalyst of EXAMPLE 1, PART A

EXAMPLE 10

This example illustrates that solvent-based coating compositions of the invention containing a sulfonimide cure catalyst cure at a rate comparable with sulfonic acid-cured compositions.

|  | Weight (g) |
|---|---|
| COMPOSITION N |  |
| JONCRYL ® 500 Acrylic Resin (80% Solids) | 81.25 |
| CYMEL ® 1168 Crosslinking Agent | 35.00 |
| di-Benzenesulfonimide (52% Solution) | 1.00 |
| n-Butanol | 20.00 |
| Xylene | 16.55 |
| Non-Volatiles: 65 Weight % |  |
| Resin/Crosslinker Weight Ratio: 65/35 |  |
| Catalyst based on resin solids: 0.5 Weight % |  |
| COMPOSITION O |  |
| JONCRYL ® 500 Acrylic Resin (80% Solids) | 81.25 |
| CYMEL ® 1168 Crosslinking Agent | 35.00 |
| p-Toluenesulfonic Acid (40 Wt % Solution) | 0.75 |
| n-Butanol | 20.00 |
| Xylene | 16.55 |
| Non-Volatiles: 65 Weight % |  |
| Resin/Crosslinker Weight Ratio: 65/35 |  |
| Catalyst based on resin solids: 0.3 Weight % |  |

Curing of Compositions N and O

The curable compositions N and O were applied on Bonderite 100 Cold Roll Steel (CRS) substrate panels by means of a #46 wire cator applicator and were cured by heating at a cure schedule of 30 minutes at 121° C. (250° F.). The cured film was evaluated by standard methods widely accepted by the coatings industry. The physical properties of the cured films obtained by curing Composition N and Composition O are listed in Table 10. Table 10 shows that the composition cure rates are comparable. This is unexpected since the acidity of sulfonimide catalysts is lower than p-toluenesulfonic acid for comparable cures. The potlife is also improved and the appearance of the cured film is better.

It is concluded from this example that sulfonimide cure catalysts of this invention are effective catalysts in solvent-based coatings, and that they cure at a rate comparable to the widely used sulfonic acid catalysts.

TABLE 10

Cure Response of Solvent-Based Coatings
Comparison of Sulfonimide and Sulfonic Acid Catalysts

|  | COMPOSITION N[a] | COMPOSITION O[b] |
|---|---|---|
| Film Thickness |  |  |
| Mils | 1.65–1.75 | 1.65–1.75 |
| mm | 0.042–0.044 | 0.042–0.044 |
| 121° C./30 min Cure |  |  |
| Hardness, $KHN_{25}$ | 8.0 | 9.0 |
| MEK Rubs | 200+[c] | 200+ |
| 135° C./30 min Cure |  |  |
| Hardness, $KHN_{25}$ | 9.7 | 9.6 |
| MEK Rubs | 200+ | 200+ |
| 149° C./30 min Cure |  |  |
| Hardness, $KHN_{25}$ | 10.1 | 10.0 |
| MEK Rubs | 200+ | 200+ |

[a] Composition containing di-benzenesulfonimide.
[b] Composition containing p-toluenesulfonic acid.
[c] Film scratches off with difficulty using fingernail immediately after 200 double rubs (film scratched while wet with MEK).

EXAMPLE 11

This example illustrates lower yellowing of sulfonimide-cured compositions relative to sulfonic acid cured compositions in base coat/clear coat solvent-based coatings under overbake cure conditions.

WHITE BASE COAT

The base coat was prepared by a procedure similar to the procedure described in Example 10 using the following ingredients and conditions:

|  | Weight (g) |
|---|---|
| Base Coat Formulation A |  |
| JONCRYL ® 500 Acrylic Resin Solids (80% Solids) | 60.00 |
| OR-650 Titanium Dioxide Pigment | 80.00 |
| Methyl Amyl Ketone | 18.00 |
| BYK ® P 104-S Wetting Agent (a product of Byk-Mallinckrodt Company, Wallingford, CT) | 0.80 |
| Base Coat Formulation B |  |
| JONCRYL ® 500 Acrylic Resin Solids (80% Solids) | 40.00 |
| CYMEL ® 303 Crosslinking Agent | 20.00 |
| n-Butanol | 15.00 |
| p-Toluenesulfonic Acid (40% Solution) | 1.00 |

After grinding Formulation A in a 3-roll mill, Formulation B was added to ground Formulation A, and applied to ED-3150A primed EP1-P60 panel, available from Advanced Coating Technologies, Hillsdale, Mo., using a #34 wire cator applicator. The resulting panels were cured at 121° C. (250° F.) for 15 minutes, and thereafter the clear topcoat Composition P and Composition Q (infra) were each applied to two separate panels coated with the base coat.

| CLEAR TOP COAT COMPOSITIONS | |
|---|---|
| | Weight (g) |
| COMPOSITION P | |
| JONCRYL ® 500 Acrylic Resin (80% Solids) | 81.30 |
| CYMEL ® 1170 Crosslinking Agent | 35.00 |
| di-Benzenesulfonimide | 0.52 |
| n-Butanol | 16.00 |
| Xylene | 21.50 |
| Non-Volatiles: 65 Wt. % | |
| Resin/Crosslinker Weight Ratio: 65/35 | |
| Catalyst based on Resin Solids: 0.5 Wt. % | |
| COMPOSITION O | |
| JONCRYL ® 500 Acrylic Resin (80% Solids) | 81.30 |
| CYMEL ® 1170 Crosslinking Agent | 35.00 |
| p-Toluenesulfonic Acid | 0.30 |
| n-Butanol | 16.00 |
| Xylene | 21.50 |
| Non-Volatiles: 65 Wt. % | |
| Resin Crosslinker Weight Ratio: 65/35 | |
| Catalyst based on Resin Solids: 0.3 Wt. % | |

Non-Volatiles: 65 Wt. %
Resin/Crosslinker Weight Ratio: 65/35
Catalyst based on Resin Solids: 0.3 Wt. %

The clear coat Compositions P and Q were each applied onto base-coated panels using a #46 wire cator applicator and thereafter cured; first at 121° C./30 minutes cure followed by an additional 149° C./30 minute cure, simulating overbake condition which commonly occur in a coating process. The results are summarized in Table 11.

It is concluded from the results in Table 11 that the solvent-based coatings compositions of the invention containing the novel sulfonimide cure catalysts of the invention have better overbake tolerance than sulfonic acid catalyzed compositions when cured under overbake conditions.

TABLE 11

Yellowing of Solvent-Based Base-Coat/Clear-Coat Coating Under Overbake Conditions
Comparison of Sulfonimide and Sulfonic Acid Catalysts

| | COMPOSITION P[a] | COMPOSITION O[b] |
|---|---|---|
| Film Thickness mils/mm | | |
| Base Coat | 1.26/0.032 | 1.28/0.032 |
| Clear Coat | 1.59/0.040 | 1.48/0.038 |
| Hardness, KHN$_{25}$ (Clear Coat) | | |
| 121° C./30 min cure | 0.8 | 8.0 |
| 121° C./30 min cure + 149° C./30 min overbake | 9.3 | 10.3 |
| Yellow Index | | |
| 121° C./30 min cure | −1.56 | −1.28 |
| 121° C./30 min cure + 149° C./30 min overbake | +2.18 | +5.32 |
| Total Color Change (difference of E) | 2.71 | 4.39 |

[a]Composition containing di-benzenesulfonimide.
[b]Composition containing p-toluenesulfonic acid.

EXAMPLE 12

This example illustrates an embodiment in which a 1:1 blend of sulfonimide cure catalyst and polyfunctional material is used to obtain Composition R, which is a curable composition containing catalyst/polyfunctional material combination of the invention.

PREPARATION OF CATALYST/POLYFUNCTIONAL MATERIAL COMBINATION

A mixture of dibenzenesulfonimide (10.0 g) and Alftalat ® AN745 solid polyester (10.0 g) was melt-mixed at 150° C. The resinous material thus obtained was cooled to room temperature and the resulting solids crushed to give a catalyst/polyfunctional material combination usable in the method of the invention.

| COMPOSITION R | Weight (g) |
|---|---|
| Arakote ® 3109 polyester (solid) | 93.50 |
| Powderlink ® 1174 crosslinking agent (solid) | 6.00 |
| Catalyst/polyfunctional material combination of this example as prepared above containing 1:1 weight ratio of dibenzenesulfonimide and Alftalat ® AN745 polyester | 1.00 |
| Benzoin (a solid additive) | 1.40 |
| R960-48 Titanium dioxide pigment | 40.00 |
| Resiflow P67 flow control agent | 1.30 |

Composition R was cured at 190° C./20 min by the method of EXAMPLE 2. The results are summarized in TABLE 12. As seen from Table 12, good film appearance (no wrinkles), film properties such as cure, impact, and gloss, and resistance properties such as resistance to humidity and salt spray are obtained. This embodiment, therefore, is within the scope of the invention.

TABLE 12

Powder Coatings Prepared by Using a Catalyst/Polyfunctional Material Combination[a] in a Curable Composition (Composition R)

| FILM APPEARANCE | Orange Peel, Microblisters, Microcraters in some areas, No Wrinkles |
|---|---|
| FILM PROPERTIES | |
| Film Thickness | |
| (mils) | 1.3–2.4 |
| (mm) | 0.033–0.061 |
| Hardness, KHN$_{25}$ | 11.2 |
| MEK Rubs | 200+ |
| Impact F/R (in-lb) | 160/160 |
| Color, Tristimulus | −0.08 |
| Gloss, | |
| 60° | 95.3 |
| 20° | 83.3 |
| RESISTANCE PROPERTIES | |
| Humidity (60° C.), Time (hrs) | 504 |
| Appearance After Testing | No Change |
| Salt Spray, Time (hrs) | 1008 |
| Creepage (mm) | 0 |
| Appearance After Testing | No Change |

[a]Dibenzenesulfonimide/Alftalat ® AN745 Polyester (1:1 weight ratio) combination at 1 wt % level based on total resin solids, corresponding to 0.5 wt % level of dibenzenesulfonimide based on total resin solids in Composition R.

EXAMPLE 13

The experiment of Example 12 was repeated with the following modifications:
1. Masterbatching was carried out using phenyl-p-tolyl-sulfonimide instead of dibenzenesulfonimide.
2. COMPOSITION S was prepared by using the masterbatch described in Example 13, part 1 (above) instead of the dibenzenesulfonimide masterbatch in Composition R of Example 12.
3. COMPOSITION T was prepared by replacing the Arakote ® 3109 polyester in Composition S with Alftalat ® AN745 polyester.

4. COMPOSITION U was prepared by replacing the Arakote® 3109 polyester in Composition S with Rucote® 101 polyester.

Table 13 summarizes the results obtained by curing the compositions S, T, and U by the 190° C./20 min protocol described in Example 12. The embodiments represented by Compositions S, T, and U, having good film properties, are also within the scope of the invention.

EXAMPLE 13
Powder Coatings Prepared by Using Phenyl-p-tolylsulfonimide/ Alftalat AN 745 Polyester Combination

|  | COMPOSITION S | COMPOSITION T | COMPOSITION U |
|---|---|---|---|
| FILM APPEARANCE | Orange Peel Microblisters Microcraters on edges | Orange Peel Microblisters | Orange Peel Microblisters |
| FILM PROPERTIES | | | |
| Film Thickness | | | |
| (mils) | 1.5–3.1 | 1.7–2.4 | 1.6–2.4 |
| (mm) | 0.038–0.079 | 0.043–0.061 | 0.041–0.061 |
| Hardness, KHN$_{25}$ | 11.8 | 11.3 | 11.1 |
| MEK Rubs | 200+ | 200+ | 200+ |
| Impact F/R (in-lb) | 160/160 | 160/160 | 160/160 |
| Color, Tristimulus | −0.09 | −0.09 | −0.09 |
| Gloss, | | | |
| 60° | 93.2 | 94.0 | 91.1 |
| 20° | 72.3 | 72.3 | 75.4 |
| RESISTANCE PROPERTIES | | | |
| Humidity (60° C.), Time (hrs) | 504 | 504 | 504 |
| Appearance After Testing | No Change | No Change | No Change |
| Salt Spray, Time (hrs) | 1056 | 1056 | 528 |
| Creepage (mm) | 0 | 0 | 0 |
| Appearance After Testing | No Change | few blisters | blisters |

Although the present invention has been described with reference to certain preferred embodiments, it is apparent that modifications and changes thereof may be made by those skilled in the art, without departing from the scope of this invention as defined by the appended claims.

What is claimed is:

1. An improved method of coating substrates by contacting said substrate with a liquid curable composition containing acid catalyst, aminoplast crosslinker, and a resin; wherein the improvement comprises:
 contacting said substrate with a coating composition comprising:
 (i) a sulfonimide cure catalyst,
 (ii) a crosslinkingly effective amount of an aminoplast crosslinking agent containing at least 2 crosslinkable groups,
 (iii) a polyfunctional material capable of reacting with aminoplast crosslinking agents, and,
 (iv) a liquid medium.

2. The method of claim 1 wherein the liquid medium (iv) is a solvent for composition ingredients (i), (ii), and (iii).

3. The method of claim 2 wherein the solvent is selected from water, alcohols, ketones, ethers, esters, aliphatic hydrocarbons, aromatic hydrocarbons, halogenated hydrocarbons, and mixtures thereof.

4. The method of claim 1 wherein the curable composition is contacted with the substrate by spraying, padding, brushing, rollercoating, curtaincoating, flowcoating, electrostatic spraying, electrocoating, or dipping.

5. The method of claim 1 wherein the sulfonimide cure catalyst (i) is represented by the formula:

RSO$_2$NZSO$_2$R wherein each of the R groups is, independently:
 (1) a linear, branched, or cyclic alkyl or fluoroalkyl of 1 to 20 carbon atoms or mixtures thereof, or
 (2) an aryl group of 1 to 20 carbon atoms containing 5 or less aromatic or heteroaromatic rings substituted by R$^1$, R$^2$, R$^3$, R$^4$, and R$^5$ groups wherein R$^1$, R$^2$, R$^3$, R$^4$, and R$^5$ groups are the same or different groups selected from a group consisting of hydrogen, fluoro, alkyl, fluoroalkyl, aryl, haloaryl, carboxyl, mercapto, vinyl, chloro, bromo, cyano, nitro, sulfonyl, acyl, alkoxycarbonyl, alkoxy, perfluoroalkoxy, hydroxy, amino, acylamino, alkoxycarbonylamino, carbamoyl, aminocarbonyl, N-alkylaminocarbonyl, and N,N-dialkylaminocarbonyl groups; or
 (3) an aralkyl group wherein the alkyl and the aryl groups have the same meaning as the alkyl and aryl groups as in (1) and (2) above; and
wherein the Z group is selected from the group consisting of:
 (4) hydrogen
 (5) acyl, and
 (6) an alkyl group or an aralkyl group of 1 to 20 carbon atoms.

6. The method of claim 5 wherein the sulfonimide cure catalyst is represented by the formula:

wherein X is independently selected from the group consisting of hydrogen, chloro, methyl, nitro, amino cyano, alkoxycarbonyl, carboxyl, acyl, N-alkylaminocarbonyl, and N,N-dialkylaminocarbonyl groups.

7. The method of claim 6 wherein the sulfonimide cure catalyst is represented by the formula:

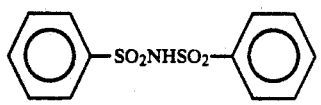

8. The method of claim 6 wherein the sulfonimide cure catalyst is represented by the formula:

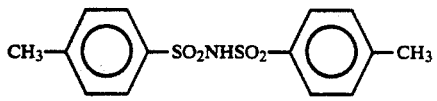

9. The method of claim 6 wherein the sulfonimide cure catalyst is represented by the formula:

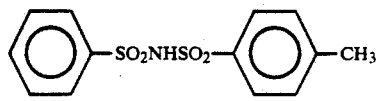

10. The method of claim 5 wherein the sulfonimide cure catalyst is represented by the formula:

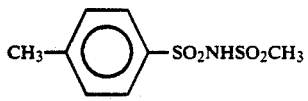

11. An improved method of coating substrates by contacting said substrates with a powder coating composition and thereafter heat curing said composition, wherein the improvement comprises:
  contacting said substrate with a curable powder coating composition comprising:
  (i) a sulfonimide cure catalyst,
  (ii) a crosslinkingly effective amount of an aminoplast crosslinking agent containing at least 2 crosslinkable groups, and
  (iii) a polyfunctional material capable of reacting with aminoplast crosslinking agents.

12. The method of claim 11 wherein all of the composition ingredients; (i), (ii), and (iii) are solids.

13. The method of claim 11 wherein the polyfunctional material is a hydroxyfunctional polyester resin or a hydroxy functional acrylic resin, carboxy functional polyester resin, and carboxy functional acrylic resins.

14. The method of claim 12 wherein the solid aminoplast crosslinking agent is the N-substituted glycoluril represented by the formula:

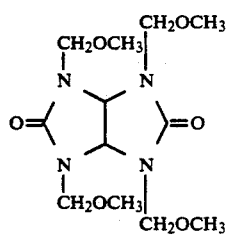

15. The method of claim 12 wherein the solid cure catalyst is the sulfonimide cure catalyst represented by the formula:

RSO₂NZSO₂R wherein each of the R groups is, independently:
  (1) a linear, branched, cyclic alkyl, or fluoroalkyl, N,N-dialkylamino group of 1 to 20 carbon atoms, or mixtures thereof, or
  (2) an aryl group of 1 to 20 carbon atoms containing 5 or less aromatic or heteroaromatic rings substituted by R¹, R², R³, R⁴, and R⁵ groups wherein R¹, R², R³, R⁴, and R⁵ groups are the same or different groups selected from a group consisting of hydrogen, fluoro, alkyl, fluoroalkyl, aryl, haloaryl, carboxyl, mercapto, vinyl, chloro, bromo, cyano, nitro, sulfonyl, acyl, alkoxycarbonyl, alkoxy, perfluoroalkoxy, hydroxy, amino, acylamino, alkoxycarbonylamino, carbamoyl, aminocarbonyl, N-alkylaminocarbonyl, and N,N-dialkylaminocarbonyl groups; or
  (3) an aralkyl group wherein the alkyl and the aryl groups have the same meaning as the alkyl and aryl groups in (1) and (2) above; and
wherein the Z group is selected from a group consisting of:
  (4) hydrogen,
  (5) acyl, and
  (6) an alkyl group or an aralkyl group of 1 to 20 carbon atoms.

16. The method of claim 15 wherein the sulfonimide cure catalyst is represented by the formula:

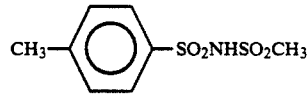

17. The method of claim 15 wherein the sulfonimide cure catalyst is represented by the formula:

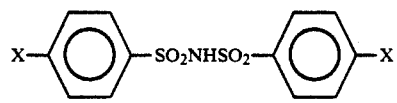

wherein X is independently selected from the group consisting of hydrogen, chloro, methyl, alkyl, nitro, amino, cyano, alkoxycarbonyl, carboxyl, acyl, N-alkylamino-carbonyl, and N,N-dialkylaminocarbonyl groups.

18. The method of claim 17 wherein the sulfonimide cure catalyst is represented by the formula:

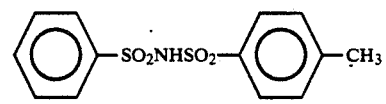

19. The method of claim 17 wherein the sulfonimide cure catalyst is di-(p-toluene)sulfonimide represented by the formula:

20. The method of claim 17 wherein the sulfonimide cure catalyst is di-(benzene)sulfonimide represented by the formula:

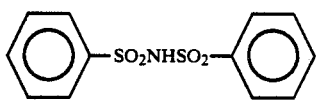

21. The method of claim 11 wherein the powder coating composition is contacted with the substrate by electrostatic spraying or fluidized bed immersion.

22. The method of claim 11 wherein the powder coating is initially melted onto the surface of the substrate and thereafter cured by continued application of heat.

23. The method of claim 11 wherein the powder coating composition is cured at a temperature from about 120° C. to about 350° C.

24. An article coated by the method of claim 11.

25. An improved method of coating substrates by contacting said substrates with a powder coating composition and thereafter heat curing said composition, wherein the improvement comprises contacting said substrate with a curable powder coating composition comprising:
 (i) a combination of sulfonimide cure catalyst-/polyfunctional material capable of reacting with aminoplast crosslinking agents,
 (ii) a crosslinkingly effective amount of a aminoplast crosslinking agent containing at least 2 crosslinkable groups,
 (iii) optionally, an additional amount of a polyfunctional material capable of reacting with aminoplast crosslinking agents, and
 (iv) other optional ingredients known to be usable in powder coating technology.

26. The method of claim 25 wherein all of ingredients (i), (ii), (iii) and (iv) are solids.

27. The method of claim 26 wherein the solid cure catalyst is the sulfonimide cure catalyst represented by the formula:

wherein each of the R groups is, independently:
 (1) a linear, branched, or cyclic alkyl or fluoroalkyl of 1 to 20 carbon atoms, or mixtures thereof, or
 (2) an aryl group of 1 to 20 carbon atoms containing 5 or less aromatic or heteroaromatic rings substituted by $R^1$, $R^2$, $R^3$, $R^4$, and $R^5$ groups wherein $R^1$, $R^2$, $R^3$, $R^4$, and $R^5$ groups are the same or different groups selected from a group consisting of hydrogen, fluoro, alkyl, fluoroalkyl, aryl, haloaryl, carboxyl, mercapto, vinyl, chloro, bromo, cyano, nitro, sulfonyl, acyl, alkoxycarbonyl, alkoxy, perfluoroalkoxy, hydroxy, amino, acylamino, alkoxycarbonylamino, carbamoyl, aminocarbonyl, N-alkylaminocarbonyl, and N-N-dialkylaminocarbonyl groups; or
 (3) an aralkyl group wherein the alkyl and the aryl groups have the same meaning as the alkyl and aryl groups in (1) and (2) above; and
wherein the Z group is selected from a group consisting of:
 (4) hydrogen,
 (5) acyl, and
 (6) an alkyl group of 1 to 20 carbon atoms containing at least one hydrogen at the position beta to the point of attachment of the alkyl group of the nitrogen of the sulfonimide.

28. The method of claim 27 wherein the sulfonimide cure catalyst is represented by the formula:

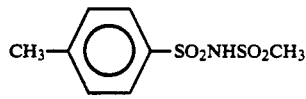

29. The method of claim 27 wherein the sulfonimide cure catalyst is represented by the formula:

wherein X is independently selected from the group consisting of hydrogen, chloro, methyl, nitro, amino, cyano, alkoxycarbonyl, carboxyl, acyl, N-alkylaminocarbonyl, and N,N-dialkylaminocarbonyl groups.

30. The method of claim 29 wherein the sulfonimide cure catalyst is di-(p-toluene)sulfonimide represented by the formula:

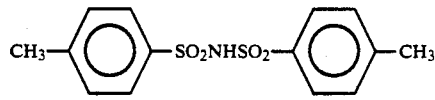

31. The method of claim 29 wherein the sulfonimide cure catalyst is di-(benzene)sulfonimide represented by the formula:

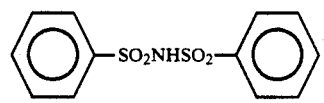

32. The method of claim 29 wherein the sulfonimide cure catalyst is phenyl-p-tolylsulfonimide represented by the formula:

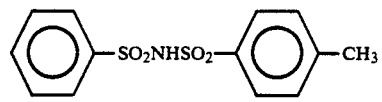

33. The method of claim 26 wherein the polyfunctional material is a hydroxyfunctional polyester resin or a hydroxy functional acrylic resin.

34. The method of claim 26 wherein the solid aminoplast resin (ii) is represented by the formula:

wherein n is the number of R groups and is at least 2, A is a substituted polyamine anchor molecule, and each R group is independently selected from hydroxymethyl, alkoxymethyl, an aminoplast containing oligomeric group, hydrogen, or alkyl; with the proviso that at least two R groups are selected from hydroxymethyl, alkoxymethyl, an aminoplast containing groups, or mixtures thereof.

35. The method of claim 34 wherein the polyamine anchor molecule of A—(R)$_n$ is derived from monomeric or oligomeric polyamines selected from the group consisting of glycoluril, melamine, benzoguanamine, cyclohexanecarboguanamine, acetoguanamine, urea, and mixture thereof.

36. The method of claim 35 wherein the aminoplast crosslinking agent (ii) is an N-substituted glycoluril represented by the formula:

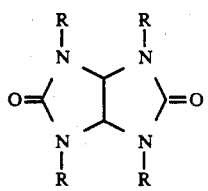

wherein at least two of the R groups are selected from the group consisting of hydroxymethyl, methoxymethyl, ethoxymethyl, propoxymethyl, butoxymethyl, pentoxymethyl, hexoxymethyl, heptoxymethyl, octoxymethyl, nonoxymethyl, decoxymethyl, and mixtures thereof, and the remaining R groups are hydrogen, or glycoluril group-containing oligomeric moieties.

37. The method of claim 36 wherein the solid aminoplast crosslinking agent is the N-substituted glycoluril represented by the formula:

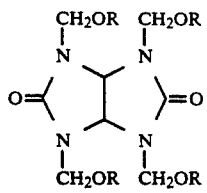

wherein R is an alkyl, aryl, or an aralkyl group of 1 to 20 carbon atoms.

38. The method of claim 26 wherein the weight ratio of the sulfonimide cure catalyst to the polyfunctional material in ingredient (i) is from about 1:10,000 to about 9:1, and preferably the ratio is from about 3:1 to about 1:20.

39. The method of claim 26 where in the weight percent of the sulfonimide cure catalyst in the catalyst/polyfunctional material ingredient (i) is from about 0.01 percent to about 90 percent, and preferably the weight percent is about 50.

40. The method of claim 26 wherein the weight percent of the sulfonimide cure catalyst/polyfunctional material ingredient (i) is in the range of 0.01 to 97.5 percent of the total weight of the resin-forming ingredients, and preferably the weight percent is about 1.0 percent of the total weight of the resin-forming ingredients.

41. The method of claim 26 wherein the weight ratio of the aminoplast crosslinking agent to total polyfunctional material is from about 1:40 to about 3:1.

42. The method of claim 26 wherein the sulfonimide cure catalyst is present at the level from about 0.01 to about 10 weight percent of the total weight of the resin-forming ingredients.

43. The method of claim 26 wherein the powder coating composition is contacted with the substrate by electrostatic spraying or fluidized bed immersion.

44. The method of claim 43 wherein the powder coating is initially melted onto the surface of the substrate and thereafter cured by continued application of heat.

45. The method of claim 44 wherein the powder coating composition is cured at a temperature from about 90° C. to about 350° C.

46. An article coated by the method of claim 26.

* * * * *